(12) United States Patent
Steinbach

(10) Patent No.: US 11,137,736 B2
(45) Date of Patent: *Oct. 5, 2021

(54) MOTOR DRIVE CONTROLLER FOR AN ELECTRIC MOTOR DRIVE SYSTEM

(71) Applicant: General Dynamics—OTS, Inc., St. Petersburg, FL (US)

(72) Inventor: Russell Steinbach, Healdsburg, CA (US)

(73) Assignee: General Dynamics—OTS, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,326

(22) Filed: Oct. 28, 2019

(65) Prior Publication Data

US 2020/0057424 A1 Feb. 20, 2020

Related U.S. Application Data

(63) Continuation of application No. 15/388,112, filed on Dec. 22, 2016, now Pat. No. 10,528,023.

(51) Int. Cl.
*G05B 19/18* (2006.01)
*H02P 27/08* (2006.01)
*H02P 6/16* (2016.01)
*H02P 25/08* (2016.01)
*H02P 25/03* (2016.01)

(52) U.S. Cl.
CPC .............. *G05B 19/182* (2013.01); *H02P 6/16* (2013.01); *H02P 25/03* (2016.02); *H02P 25/08* (2013.01); *H02P 27/08* (2013.01); *G05B 2219/41336* (2013.01); *H02P 2201/11* (2013.01)

(58) Field of Classification Search
CPC ........ G05B 19/182; G05B 2219/41336; H02P 27/08; H02P 6/16; H02P 25/08; H02P 25/03; H02P 2201/11
See application file for complete search history.

(56) References Cited

U.S. PATENT DOCUMENTS

| | | | |
|---|---|---|---|
| 4,019,105 A | 4/1977 | Cornell et al. | |
| 4,115,915 A | 9/1978 | Godfrey | |
| 4,683,412 A * | 7/1987 | Bialek .................... | H02P 27/048 318/762 |
| 4,801,832 A * | 1/1989 | Neumann ............... | H02K 1/165 310/216.111 |
| 4,904,919 A * | 2/1990 | McNaughton .......... | H02P 27/08 318/798 |
| 5,583,416 A | 12/1996 | Klang | |
| 5,811,949 A | 9/1998 | Garces | |
| 5,818,708 A | 10/1998 | Wong | |
| 6,462,520 B1 * | 10/2002 | Mangtani ............... | H02M 3/158 323/271 |

(Continued)

*Primary Examiner* — Muhammad S Islam
*Assistant Examiner* — Devon A Joseph
(74) *Attorney, Agent, or Firm* — LKGlobal | Lorenz & Kopf, LLP

(57) ABSTRACT

A motor drive controller is provided that includes a current source inverter. The current source inverter includes driver circuitry configured to generate switching commands; a variable current source configured to generate a variable current that regulates power in a motor; and motor commutation circuitry configured to receive the variable current and switching commands, and to commutate phase currents that are output to the motor.

8 Claims, 19 Drawing Sheets

(56) References Cited

U.S. PATENT DOCUMENTS

| | | |
|---|---|---|
| 6,465,993 B1 | 10/2002 | Clarkin |
| 7,075,276 B2 | 7/2006 | Morales |
| 7,495,363 B2* | 2/2009 | DeLair .................... H02K 3/28 |
| | | 310/179 |
| 8,264,191 B1* | 9/2012 | Ranganathan ............ H02P 1/26 |
| | | 318/767 |
| 8,421,397 B2* | 4/2013 | Yu ............................ H02P 1/28 |
| | | 318/779 |
| 9,054,621 B2 | 6/2015 | Liu |
| 9,295,116 B2 | 3/2016 | Sanders et al. |
| 2003/0173857 A1 | 9/2003 | Jones |
| 2005/0242793 A1 | 11/2005 | Deaton |
| 2007/0138895 A1* | 6/2007 | DeLair .............. H02K 15/0081 |
| | | 310/179 |
| 2008/0265586 A1* | 10/2008 | Like .................. H05K 7/20854 |
| | | 290/38 R |
| 2009/0121695 A1 | 5/2009 | Pierson et al. |
| 2012/0049776 A1* | 3/2012 | Kern ....................... H02P 6/182 |
| | | 318/400.34 |
| 2012/0056567 A1 | 3/2012 | Savagian |
| 2012/0086334 A1* | 4/2012 | DeVincentis ......... H01J 65/044 |
| | | 315/40 |
| 2012/0212169 A1* | 8/2012 | Wu ....................... H02P 29/662 |
| | | 318/432 |
| 2013/0073229 A1* | 3/2013 | LePort ................ H01M 50/581 |
| | | 702/58 |
| 2013/0107586 A1* | 5/2013 | Klodowski ............. H02P 21/06 |
| | | 363/34 |
| 2013/0152333 A1 | 6/2013 | Reed et al. |
| 2015/0002067 A1* | 1/2015 | Nondahl ................. H02P 21/00 |
| | | 318/503 |
| 2015/0137764 A1 | 5/2015 | Kessler |
| 2015/0145364 A1* | 5/2015 | Holcomb ............... H02K 53/00 |
| | | 310/113 |
| 2015/0295478 A1 | 10/2015 | Creviston et al. |
| 2017/0179833 A1* | 6/2017 | Adragna ................ H02M 1/08 |

* cited by examiner

MOTOR DRIVE CONTROLLER FOR AN ELECTRIC MOTOR DRIVE SYSTEM

CROSS-REFERENCE TO RELATED APPLICATION

This is a Continuation of U.S. patent application Ser. No. 15/388,112, filed Dec. 22, 2016, which is incorporated herein by reference in its entirety.

TECHNICAL FIELD

The technical field generally relates to electric motors, and more particularly relate to an electric motor drive system for driving a low-voltage motor.

BACKGROUND

In recent years, there have been many advances in electric motors driven by inverters with power from a direct current (DC) power source, such as a storage battery. In many systems it is desirable to provide small, high efficiency electric motor systems. Some examples include battery powered medical devices, small portable tools, hobbyist vehicles or aircraft, and miniature servo actuator systems. For instance, many military systems that operate on battery power are increasingly demanding smaller, higher efficiency electric servo controls because higher efficiency allows for longer operating times. Examples would include small unmanned aerial vehicles (UAVs), such as small drone aircraft or quadcopter aircraft, controls for small diameter missiles, and gun-launched projectiles.

Traditional motors include several multi-turn coils. Such motors have a relatively high back electromotive force (BEMF), and a relatively low motor constant. Moreover, as size decreases, such motor and their motor drive systems become increasing difficult to manufacture. In addition, as size decreases the efficiency of converting electrical power to mechanical power also inherently decreases.

It would be desirable to provide a high-performance motor system that includes a small motor that is also easy to manufacture. It would be desirable to provide a high-performance motor capable of operating in a battery powered system having low voltage batteries. It would also be desirable to provide such a motor that has low inductance and low resistance. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to an electric motor drive system for driving a low-voltage motor.

In accordance with some of the disclosed embodiments, an electric motor drive system is provided that is configured to drive a low-voltage motor. The low-voltage motor includes a rotor and a stator that comprises a number of single-turn coils. A motor drive controller can control the low-voltage motor. The motor drive controller includes a current source inverter. The current source inverter includes driver circuitry configured to generate switching commands, a variable current source and motor commutation circuitry. The variable current source can generate a variable current that regulates power in the low-voltage motor. The motor commutation circuitry receives the variable current and switching commands, and outputs phase currents to the low-voltage motor. The motor commutation circuitry commutates the phase currents at the low-voltage motor.

DESCRIPTION OF THE DRAWINGS

Embodiments of the present disclosure will hereinafter be described in conjunction with the following drawing figures, wherein like numerals denote like elements, an FIG. 1 is a block diagram of a non-limiting embodiment of an electric motor drive system in accordance with the disclosed embodiments.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Figure 1:
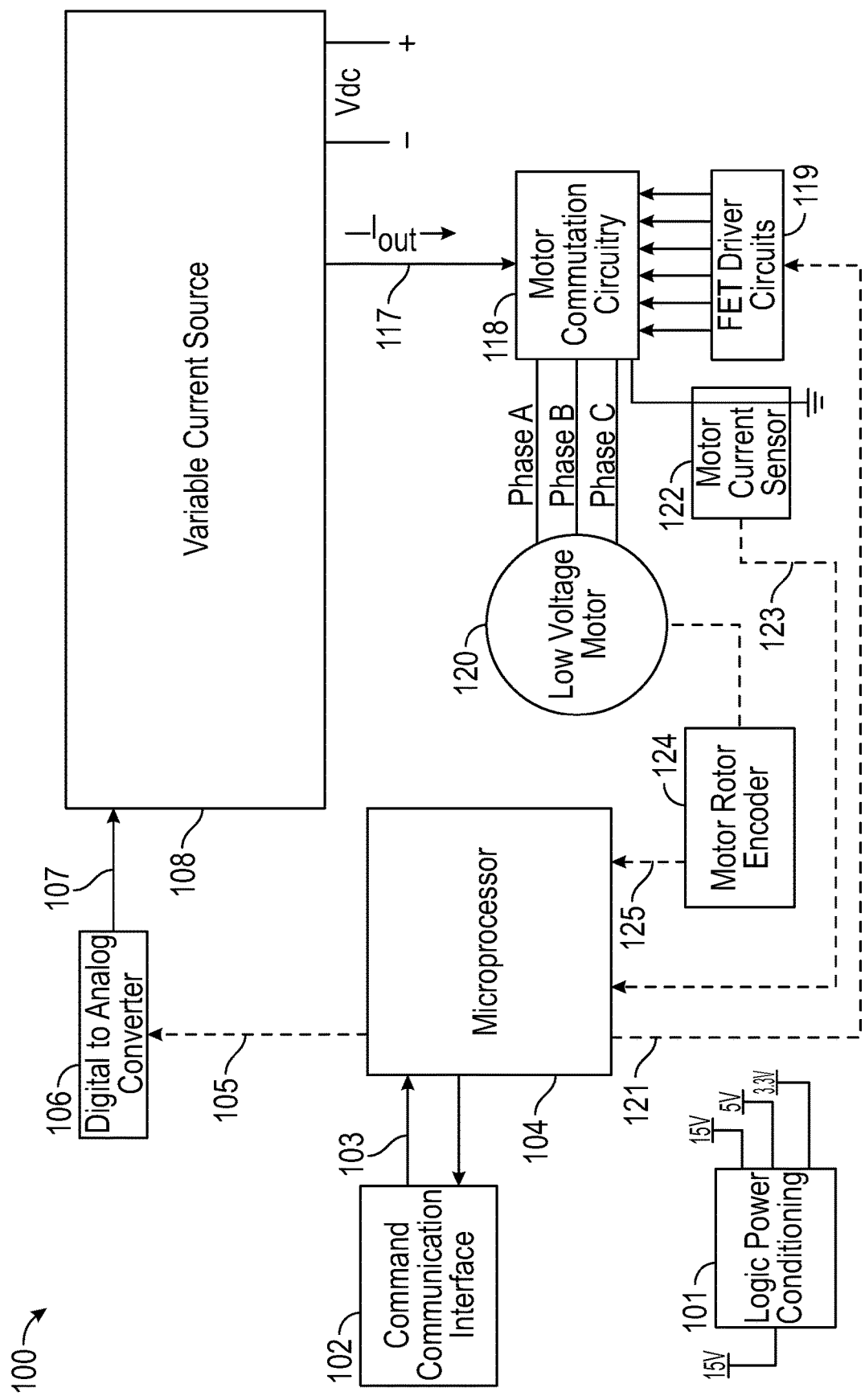

FIG. 1 is an electric motor drive system 100 in accordance with the disclosed embodiments. The electric motor drive system 100 includes logic power conditioning circuitry 101, a command communication interface 102, a processor 104, a digital-to-analog (D/A) converter 106, a variable current source 108, motor commutation circuitry 118, motor commutation driver circuitry 119, a low voltage motor (LVM) 120, a motor current sensor 122, and a motor rotor encoder 124.

Although not illustrated, the electric motor drive system 100 can include a low-voltage battery having a voltage in the range of 3 to 24 volts DC, and in one implementation is a 15-volt battery. The logic power conditioning circuitry 101 receives this input voltage and generates various different output voltages that are required by the command communication interface 102, the processor 104, the D/A converter 106, the variable current source 108, the motor commutation circuitry 118, the motor commutation driver circuitry 119, the motor current sensor 122, and the motor rotor encoder 124. In this particular non-limiting example, the logic power conditioning circuitry 101 receives input voltage of 15 V and generates output voltages of 3.3 V, 5 V and 15 V.

As will be described in greater detail below, the LVM 120 is a very low voltage and high performance motor. The LVM 120 is a driven by a very high current, and is configured to rotate very fast at a low voltage (e.g., nearly 10,000 rpm per volt in one implementation), and is therefore capable of operating in battery powered systems having low voltage batteries. The LVM 120 can also be described as a single-turn motor (STM) since the stator (not illustrated in FIG. 1) of the LVM 120 has single-turn coils. A single-turn coil is a coil that has a single turn (or single loop of conductor). In other words, a single-turn coil has only one conductor on each side of the single-turn coil. By contrast, a multi-turn coil includes more than one turn of conductor (or more than one loop of conductor). As such, a single-turn coil differs from a multi-turn coil in that a multi-turn coil has multiple conductors per side of the coil. The LVM 120 includes two or more phase windings. Each phase winding includes plurality of the single-turn coils connected together. A single turn coil also results in a low resistance, low inductance motor.

In any motor, the torque that is output from the rotor is directly proportional to the magnetic fields created by the coils in the stator. This magnetic field strength is the product of the ampere-turns of a coil. Traditional motors having multi-turn coils require relatively high voltages to drive current into the motor due to their inherent high resistance. Multi-turn coils also exhibit higher higher inductance which results in higher BEMF when the motor is turning. This further exacerbates a traditional motor's need to be driven with higher voltage (12 to 160 volts being common).

As the number of turns in the coil decrease, the current supplied to the motor must be proportionately increased to create the same magnetic field. Because the LVM 120 utilizes single-turn coils, the LVM 120 has extremely low resistance. This allows for a high current to flow through the phase windings even when the LVM 120 is powered from a low voltage source. Also, because the LVM also has an extremely low inductance, it has a very low back electromotive force (BEMF). Thus, because the LVM 120 can accept a high current (at a very low voltage), power can be driven into the LVM 120 so that the LVM 120 can run at very high speed even though the LVM 120 is powered from a low voltage source (e.g., 25 amperes at 3 volts while spinning at 20,000 rpm drawing 75 watts of power).

In one particular implementation, the LVM 120 comprises a three-phase motor, but in the general the LVM 120 can be a multi-phase alternating current (AC) motor having any number of phases greater than or equal to two. As used herein, the term "multi-phase" refers to two or more phases, and can be used to refer to electric motors that have two or more phases. As used herein, the term "alternating current (AC) motor" generally refers to "a device or apparatus that converts electrical energy to mechanical energy." In one embodiment, the LVM is a high performance brushless DC motor (BLDC) in which motor torque is directly proportional to motor current. In other embodiments, the LVM 120 can be a Permanent Magnet Synchronous Machine (PMSM) or Variable Reluctance Stepper Motor (VRSM).

Conventional motor drive systems used to control a motor use Pulse Width Modulation (PWM) in conjunction with a bridge inverter to change the average voltage across the motor. For instance, to vary the average voltage across the motor, a typical bridge inverter that operates according to a Voltage Source Inverter (VSI) type control scheme commutates the motor and is also modulated with a high frequency (e.g., 25 kHz) PWM signal where the PWM duty cycle is used to change the average voltage across the motor. The PWM frequency (typically 20 to 60 kHz) is selected such that the motor coil inductance and resistance do not allow the motor current to change significantly over a single PWM period (motor current ripple). Achieving low current ripple minimizes quiescent motor $I^2R$ losses. This is commonly referred to as a VSI type control scheme.

The LVM 120 includes two or more phase windings. Each phase winding includes plurality of the single-turn coils connected together. As noted above, because the LVM 120 employs single-turn coils, the LVM 120 has very low inductance and very low resistance. For example, in some embodiments, the LVM 120 has a phase-to-phase inductance between 250 nanohenries (nH) and 1 microhenries (µH) and a phase-to-phase resistance much less than one ohm (e.g., 0.03 to 0.01 ohms) when measured phase-to-phase on a "Wye" type winding. For instance, in one implementation, the LVM 120 has a phase-to-phase inductance between 550 nanohenries (nH) and a phase-to-phase resistance 25 milliohms when measured phase-to-phase on a "Wye" type winding.

Due to the low inductance of the LVM 120, a conventional VSI control scheme cannot be used drive the LVM 120 because a traditional voltage-modulated controller would require an impractically high PWM frequency. In accordance with the disclosed embodiments, to address the issue of low inductance, a Current Source Inverter (CSI) is used to drive the LVM 120. Driving the LVM 120 using a CSI can help reduce and/or eliminate current ripple losses. The CSI includes the variable current source 108, the motor commutation circuitry 118, the motor commutation driver circuitry 119, and the motor current sensor 122. The motor commutation circuitry 118 is implemented using a bridge inverter circuit. In contrast to a conventional VSI, in the CSI in accordance with the disclosed embodiments, the motor commutation circuitry 118 only functions to commutate the LVM 120 (i.e., switches phase currents in phases of the LVM 120 to generate motion, but does not vary the average voltage across the motor via a PWM signal superimposed on the basic commutation signal).

The variable current source 108 can vary depending on the implementation. In one implementation, the variable current source 108 processes the digital voltage commands 107 to generate PWM waveforms that drive one or more buck converter circuits configured as a variable current source to regulate power in the LVM 120. Three non-limiting examples of the variable current source 108 will be described below with reference to FIGS. 2-4. In one embodiment, the output current 117 generated by the variable current source 108 can vary between 10 and 150 amperes at a very low voltage (e.g., 0.1 to 3.0 volts).

The command communication interface 102 is coupled to the processor 104 by transmit and receive communication paths. The command communication interface 102 sends various commands to the processor 104 via the transmit communication path, and receives various information back from the processor 104 via the receive communication path. For example, in one embodiment, the command communication interface 102 sends commands 103 (e.g., position commands or velocity commands) to the processor 104 via the transmit communication path, and receives feedback information back from the processor 104 via the receive communication path. In one non-limiting implementation the commands 103 that the command communication interface 102 sends to the processor can be position commands used to control an actuator that controls position of a flight control surface (e.g., fins, canards, strakes, etc.) on a missile or guided projectile. In such implementations, the feedback information that the command communication interface 102 receives back from the processor 104 can be telemetry information (e.g., current fin position, motor current, BIT status, motor speed) that is then provided to another computer (e.g., a mission computer).

The current sensor 122 senses and samples the stator current in the LVM 120 and outputs a sensed current signal 123 to the processor 104 that is used to regulate the variable current source 108 and control the LVM 120. More specifically, the processor 104 uses the sensed current signal 123 to set motor torque by changing the variable current 117 that is output by the variable current source 108. For example, in one embodiment, the processor 104 uses the sensed current signal 123 to set motor torque by changing the duty cycle of the PWM command signal that are used to generate gate drive signals that control operation of the buck converter circuit (not illustrated in FIG. 1) of the variable current source 108. By changing the duty cycle of the PWM command signal, the processor 104 changes the variable current 117 that is output by the buck converter circuit (not illustrated) of the variable current source 108.

The motor rotor encoder 124 senses the angular position (Θr) of a rotor of the LVM 120, and outputs rotor angle information as a sensed angular position signal 125 to the processor 104. The motor rotor encoder 124 is a position sensor that measures the angular "shaft position" of the LVM's rotor. The sensed angular position signal 125 allows the processor 104 to generate drive commands 121 that are provided to the motor commutation driver circuitry 119. The driver circuitry 119 uses the drive commands 121 to turn on an appropriate pair of FETs in the motor commutation circuitry 118 to control commutation of the LVM 120.

The processor 104 processes the commands 103, the sensed current signal 123 and the sensed velocity signal 125 as feedback to generate analog voltage command signal 105. The processor 104 outputs analog voltage command signal 105 to the D/A converter 106. The D/A converter 106 converts the analog voltage command signal 105 into a voltage commands 107 having a low or a high value (e.g., 0 to 1 volt value). The variable current source 108 receives the voltage commands 107 and processes them to generate a current 117 that is supplied to the motor commutation circuitry 118. The value of the voltage commands 107 will cause the variable current source 108 to output current 117. The current 117 has a variable value that can be adjusted based on the value of the voltage commands 107 to drive the LVM 120 to a commanded angular velocity that corresponds to the commands 103 from the command communication interface 102.

The processor 104 generates the drive signals 121 that are provided to the motor commutation driver circuitry 119, and the motor commutation driver circuitry 119 outputs switching commands to the motor commutation circuitry 118.

The motor commutation circuitry 118 can be a conventional inverter bridge circuit constructed using six MOSFETs as will be described below with reference to FIG. 5. In accordance with the disclosed embodiments, the motor commutation circuitry 118 is used only for commutating the current in the LVM 120 (i.e., switches phase currents in phases of the LVM 120 to generate motion of the rotor, but does not vary the average voltage across the motor via a PWM signal superimposed on the basic commutation signal as in the case of a VSI). The motor commutation circuitry 118 receives the current 117 from variable current source 108 and switching commands from the driver circuitry 119 and uses these inputs to generate phase currents that drive the LVM 120. The controller regulates the current supplied to the LVM 120 based on external system requirements such as controlling the angular velocity (ωr) of the LVM 120, or to controlling the position of an actuator driven by the LVM 120.

Although not illustrated, the LVM 120 includes a stationary stator having single-turn coils that can produce a rotating magnetic field, and a rotor attached to an output shaft that is given a torque by the rotating field. The output shaft of the LVM 120 generates mechanical power (Torque×Speed) and can be coupled to a gear that is used to drive apparatus such as an actuator (not illustrated) that can control another element. For instance, in one implementation, the LVM 120 is used to drive a servo controlled actuator that controls an aerodynamic flight control surface.

Figure 2:
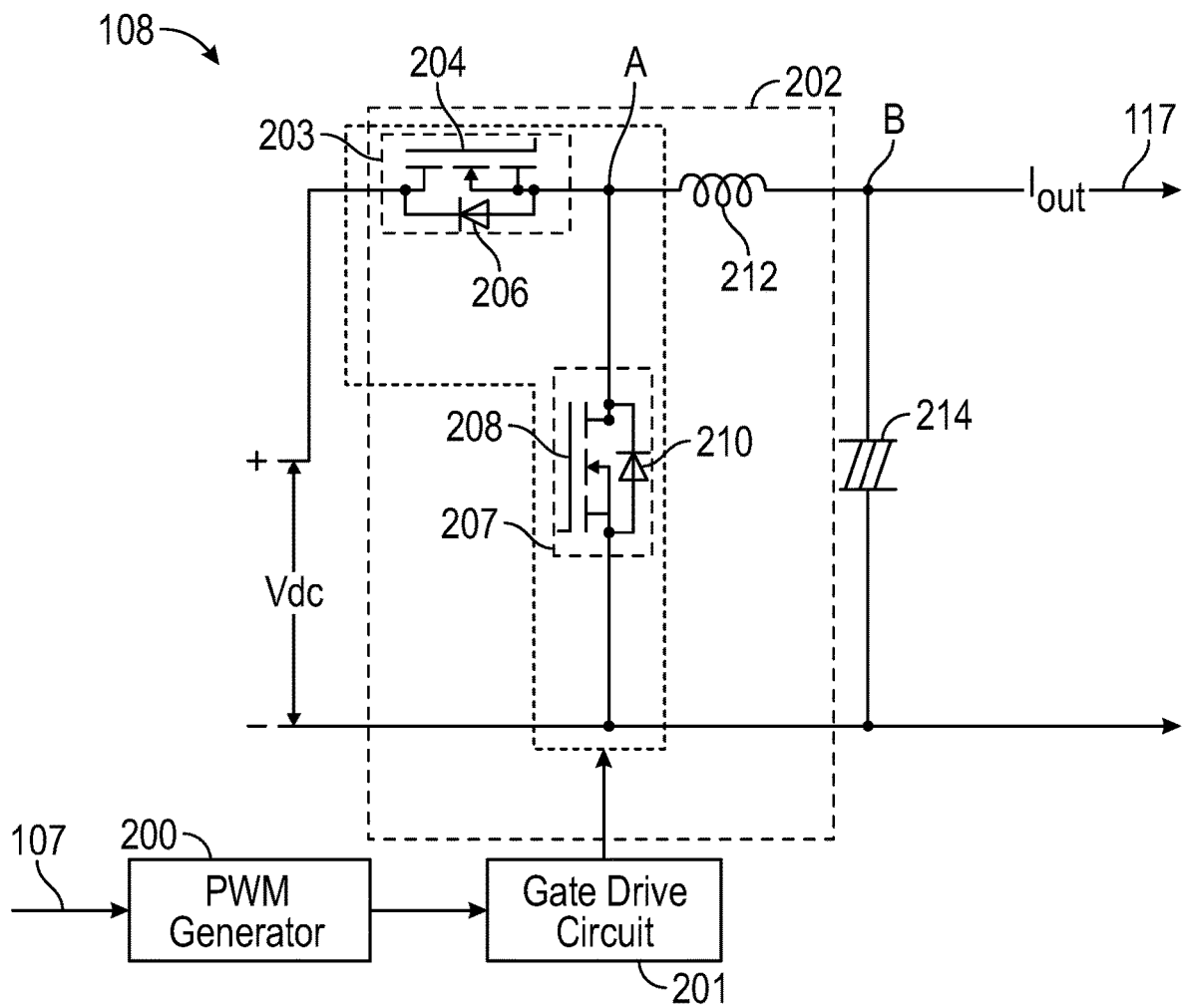
FIG. 2 is a schematic view that illustrates a variable current source in accordance with a non-limiting embodiment.

FIG. 2 is a schematic view that illustrates a variable current source 108 in accordance with a non-limiting embodiment. FIG. 2 will be described with reference to FIG. 1. The variable current source 108 includes a PWM waveform generator 200, a gate driver circuitry 201, and a buck converter circuit 202.

As is known in the art, the buck converter circuit 202 (also referred to as a step-down converter) is a DC-to-DC power converter which decreases (or steps down) input voltage (VDC) from its input (or supply) to its output (or load), while increasing (or "stepping up") its output current (Iout) 117. The buck converter circuit 202 is a class of switched-mode power supply (SMPS). In this embodiment, the buck converter circuit 202 is configured to receive an input voltage (VDC), and includes switching element 203, switching element 207, an inductor 212 that serves as an energy storage element, and an output capacitor 214 to reduce voltage ripple. The output capacitor 214 can include other elements (e.g., capacitors or inductors) as known in the art to filter the output of buck converter circuit 202. In one embodiment, the input voltage (VDC) can be generated by a battery connected in parallel with a filtering capacitor (not illustrated).

The switching element 203 includes a high-side transistor 204 and it inherent body diode 206. Likewise, the switching element 207 includes a low-side transistor 208 and its inherent body diode 210. In one embodiment, the transistors 204, 208 are enhancement mode, N-channel metal-oxide-semiconductor field-effect transistors (MOSFETs).

The PWM waveform generator 200 receives digital voltage commands 107 and generates, based on the digital voltage commands 107, the PWM command signal that is supplied to the gate driver circuitry 201. The PWM waveform generator 200 generates an output voltage (i.e., PWM command signal) having a pulse width that is modulated using a control voltage (i.e., digital voltage commands 107) to change the pulse width of the output voltage waveform, which in turn controls the power supplied to the LVM 120. The PWM waveform generator 200 can be implemented using, for example, using timer or comparator based circuits as known in the art.

The PWM command signal generated by the PWM waveform generator 200 is characterized by a frequency/period and a duty cycle that can be varied to adjust current in the LVM 120. The term duty cycle describes the proportion of 'on' time to the period and is expressed in percent, where a duty cycle of 100% means that the PWM command signal is fully on. A lower duty cycle corresponds to lower power, and a higher duty cycle corresponds to higher power. The period is the inverse of the frequency of the PWM command signal and the duty cycle of the PWM command signal can vary between 0% and 100% DC. For instance, in one non-limiting implementation, the frequency of the PWM command signal is 825 kHz, hence the period is about 1.2 microseconds (e.g., 1/825 kHz), and the duty cycle of the PWM command signal can vary between 0 and 1.2 microseconds (0% DC to 100% DC).

The processor 104 processes the sensed current signal 123 and changes the duty cycle of the PWM command signal (e.g., based on a control law driven from external variables such as motor velocity or actuator position).

The gate driver circuitry 201 receives the PWM command signal and uses the PWM command signal to generate a gate drive signal that is supplied to the buck converter circuit 202 of the variable current source 108 to control operation of the buck converter circuit 202. Specifically, the gate drive signal is used to drive the gates of a transistor 204 of the switching element 203 and a transistor 208 of switching element 207. To explain further, the gate driver circuitry 201 can generate a high current pulse to quickly (<<100 ns) turn on a transistor. The gate driver circuitry 201 includes logic that ensures that the transistor 204 and transistor 208 are never turned on at the same time. As such, when transistor 204 is on, transistor 208 is off, and vice-versa. The transistors 204, 208 have a near zero voltage drop when on and a near zero current flow when off. Further, the inductor has a near zero series resistance. The transistors 204, 208 are modulated at high frequency (e.g., 1 MHz) by the gate drive signal from the gate driver circuitry 201 to provide the required current to the LVM 120. The gate drive signals from the gate driver circuitry 201 switch the transistors 204, 208 on or off to control the current that flows through node A into the inductor 212. Thus, by changing the duty cycle of the PWM command signal, the processor 104 changes the variable current 117 that is output by the buck converter circuit 202 of the variable current source 108.

Figure 3:
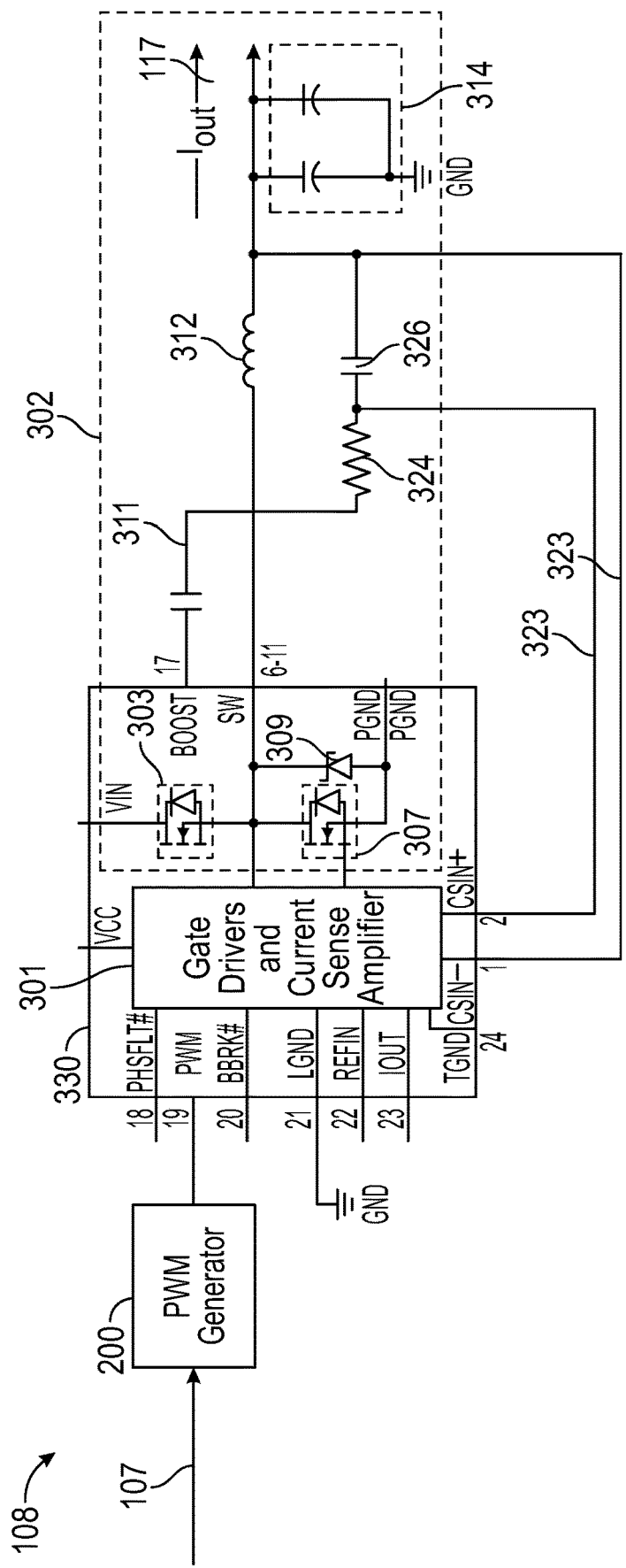
FIG. 3 is a schematic view that illustrates a variable current source in accordance with another non-limiting embodiment.

FIG. 3 is a schematic view that illustrates a variable current source 108 in accordance with another embodiment. FIG. 3 will be described with reference to FIGS. 1 and 2. The variable current source 108 includes a PWM waveform generator 200, an integrated circuit 330 and other external circuit elements including a capacitor 311, an inductor 312, capacitors 314, a resistor 324 and a capacitor 326 that complete a buck converter 302 in this particular implementation.

The PWM waveform generator 200 receives the signal 107 (FIG. 1) and generates a PWM drive signal that is supplied to an integrated circuit 330. The integrated circuit 330 includes a portion of the buck converter circuitry 302 and also integrates gate drivers 301 and a current sense amplifier 322. The gate drivers 301 and current sense amplifier 322 are illustrated in a single block for sake of convenience; however, those skilled in the art will understand that these are actually separate circuit elements. Operation of the gate drivers is described above with reference to FIG. 2. Other parts of the buck converter 302 that are included within the chip include a switching elements 303, 307 that are analogous to the switching elements 203, 207 that are described above. In addition, in this particular embodiment, the Schottky diode 309 is coupled in parallel with the switching element 307.

In this implementation, the remainder of the buck converter 302 is provided external to the chip 330. In this non-limiting implementation, the external elements of the buck converter 302 include a capacitor 311, an inductor 312, capacitors 314, a resistor 324 and a capacitor 326. The inductor 312 is an energy storage element that is operationally equivalent to the inductor 212 described above. The inductor 312 generates an output current (Iout), which in one non-limiting implementation, is between zero and 30 amperes. As described above with respect to FIG. 2, the variable current source 108 also includes output capacitance 314, which in this non-limiting implementation consists of two capacitors coupled in parallel meaning that the capacitances of each capacitor add together.

One advantage of this implementation is that it can help minimize system losses and weight because it allows for the high current source (implemented with buck converter 302) to be closely coupled to the LVM 120. For example, in one implementation, the integrated circuit 330 is small enough in size (e.g., 4 mm×6 mm×0.8 mm) to allow for the variable current source drive to be assembled onto the motor. This can help reduce the problem of $I^2R$ losses that would otherwise result from high current wiring to the motor.

Figure 4:
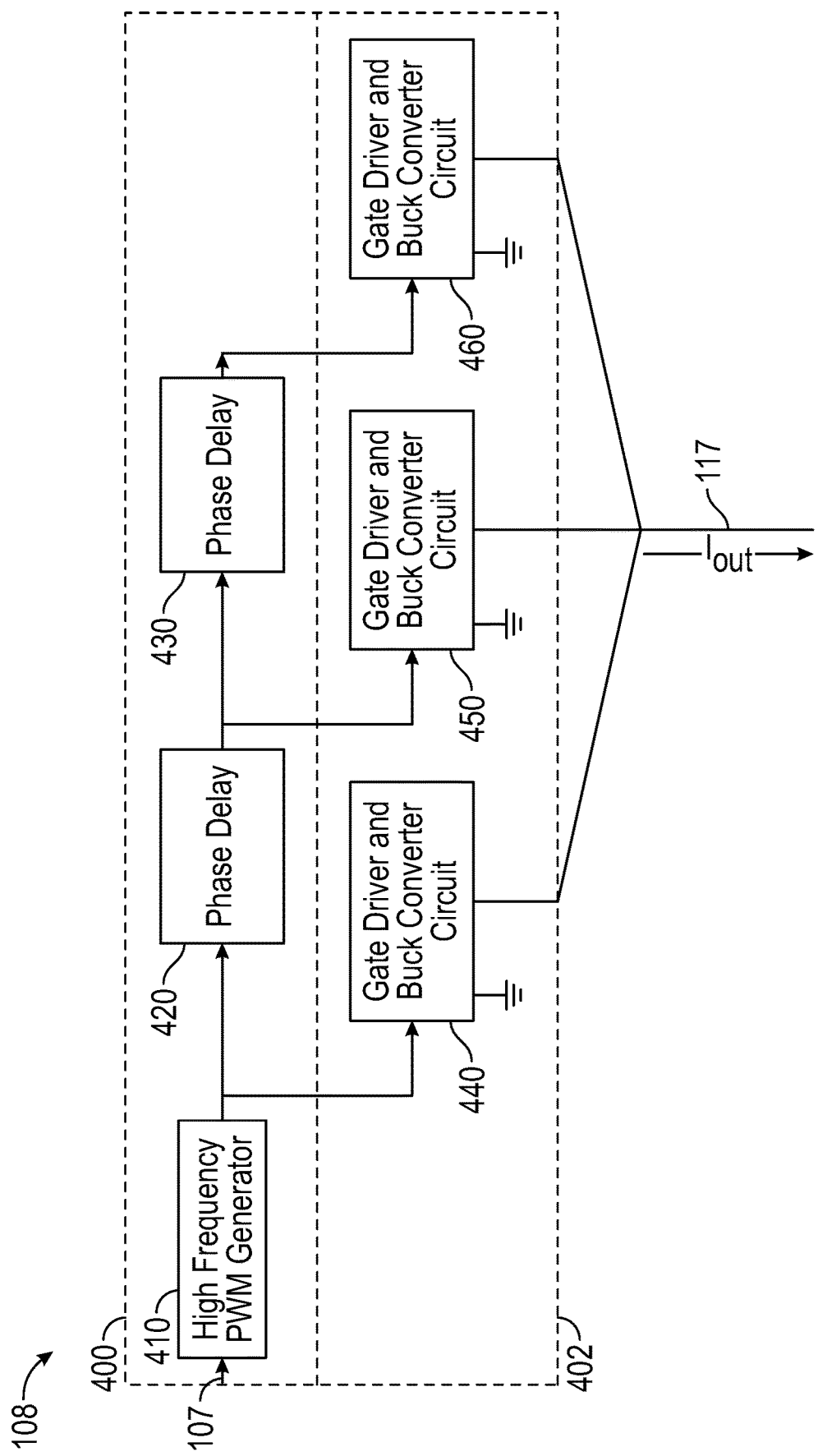
FIG. 4 is a block diagram that illustrates a variable current source in accordance with another non-limiting embodiment.

FIG. 4 is a block diagram that illustrates a variable current source 108 in accordance with another embodiment. In this embodiment the variable current source 108 is a multiphase variable current source. The multiphase variable current source includes a high frequency PWM waveform generator 410, phase delay elements 420, 430, and buck converter circuits 440, 450, 460. Although not illustrated, it is noted that the gate driver and buck converter circuits 440, 450, 460 are circuits (e.g., integrated circuits in one embodiment) that each include a gate driver and a buck converter circuit. The phase delay elements 420, 430 introduce phase delays so that each of the three "phases" is turned on at equally spaced intervals over the switching period. This embodiment can be used when a higher current is needed so that current from the battery is more evenly distributed over time.

The PWM waveform generator 410 operates similar to the PWM waveform generator 200 that is described above with reference to FIG. 2. The high frequency PWM waveform generator 410 receives the digital voltage commands 107 from the D/A converter 106 (FIG. 1) and generates a PWM command signal that is supplied to phase delay element 420 and the gate driver and buck converter circuit 440. The PWM command signal has a pulse width that is modulated using the digital voltage commands to change the pulse width. The pulse width modulated command signal has a duty cycle that varies to control power supplied to the LVM 120. The gate driver and buck converter circuit 440 also receives a supply voltage (e.g., between five and twenty volts in one implementation). The gate driver and buck converter circuit 440 includes a gate driver that receives the PWM drive signal from the PWM waveform generator 410, and generates a first gate drive signal. Based on the first gate drive signal and the supply or input voltage, the buck converter circuit can generate a first variable current, which in one non-limiting implementation, is between 10 and 150 amperes.

The phase delay element 420 can receive the PWM drive signal, and can introduce a 120-degree phase delay to the PWM drive signal to generate a first phase-delayed drive signal, and supplies the first phase-delayed drive signal to the phase delay element 430 and to the gate driver and buck converter circuit 450. The gate driver and buck converter circuit 450 also receives a supply voltage (e.g., between five and twenty volts in one implementation). The gate driver and buck converter circuit 450 includes a gate driver that receives the first phase-delayed drive signal and generates a second gate drive signal, and its buck converter circuit can generate a second variable current based on the second gate drive signal and the input voltage. The second variable current can be the same as the first variable current as described above.

Similarly, the phase delay element 430 can receive the first phase-delayed drive signal from phase delay element 420, and can introduce another 120-degree phase delay to the first phase-delayed drive signal to generate a second phase-delayed drive signal. The phase delay element 430 can supply the twice phase-delayed PWM drive signal to the gate driver and buck converter circuit 460. The gate driver and buck converter circuit 460 also receives a supply voltage (e.g., between five and twenty volts in one implementation). The gate driver and buck converter circuit 460 includes a gate driver that receives the second phase-delayed drive signal and generates a third gate drive signal, and its buck converter circuit can generate a third variable current based on the third gate drive signal and the supply/input voltage. The third variable current can be the same as the first variable current as described above.

The first, second, and third variable currents are summed to generate the variable current (Iout)117 that is output or provided to the motor commutation circuitry 118 as described above.

Figure 5:
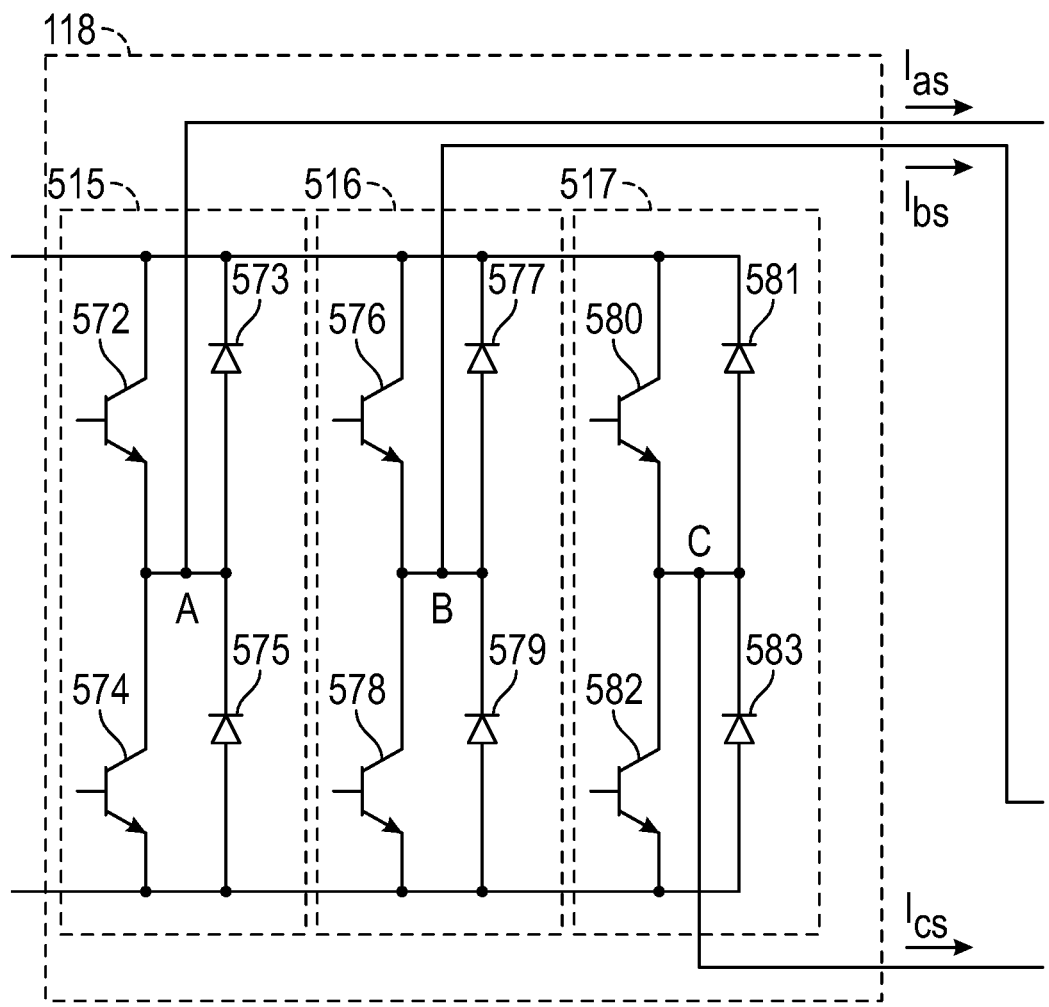
FIG. 5 is a schematic view that illustrates a motor commutation circuitry in accordance with a non-limiting embodiment

FIG. 5 is a schematic view that illustrates a motor commutation circuitry 118 in accordance with a non-limiting embodiment. FIG. 5 will be described with reference to FIG. 1. The motor commutation circuitry 118 is connected to motor terminals A, B, C of the LVM 120. The motor commutation circuitry 118 includes three sub-modules 515, 516, 517. Each sub-module includes two solid state controllable switching devices and two diodes. In this particular embodiment, the sub-module 515 corresponds to phase A and comprises a dual switch 572/573, 574/575 that outputs phase current (Ia), the sub-module 516 corresponds to phase B and comprises a dual switch 576/577, 578/579 that outputs phase current (Ib), and the sub-module 517 corresponds to phase C and comprises a dual switch 580/581, 582/583 that outputs phase current (Ic). The resultant stator currents (Ia . . . Ic) that are generated by the sub-modules 515, 516, 517 are provided to motor windings depending on the open/close states of switches in the sub-modules 515, 516, 517. Switching signals from the driver circuit 119 control the switching states of switches so that at no time are both switches in the same sub-module 515, 516, 517 or "leg" are turned on. As such, the switches in the same sub-module 515, 516, 517 are operated such that when one is off the other is on and vice versa. To explain further, in a given phase (A . . . C) at any particular time, one of the switches is off and the other one of the switches is on (i.e., the two switches in a particular sub-module must have opposite on/off states). As one example with respect to phase A, when switch 572 is on, switch 574 is off, and vice-versa. As such, for a particular sub-module, the on/off status of the two switches in that sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

Figure 6A:
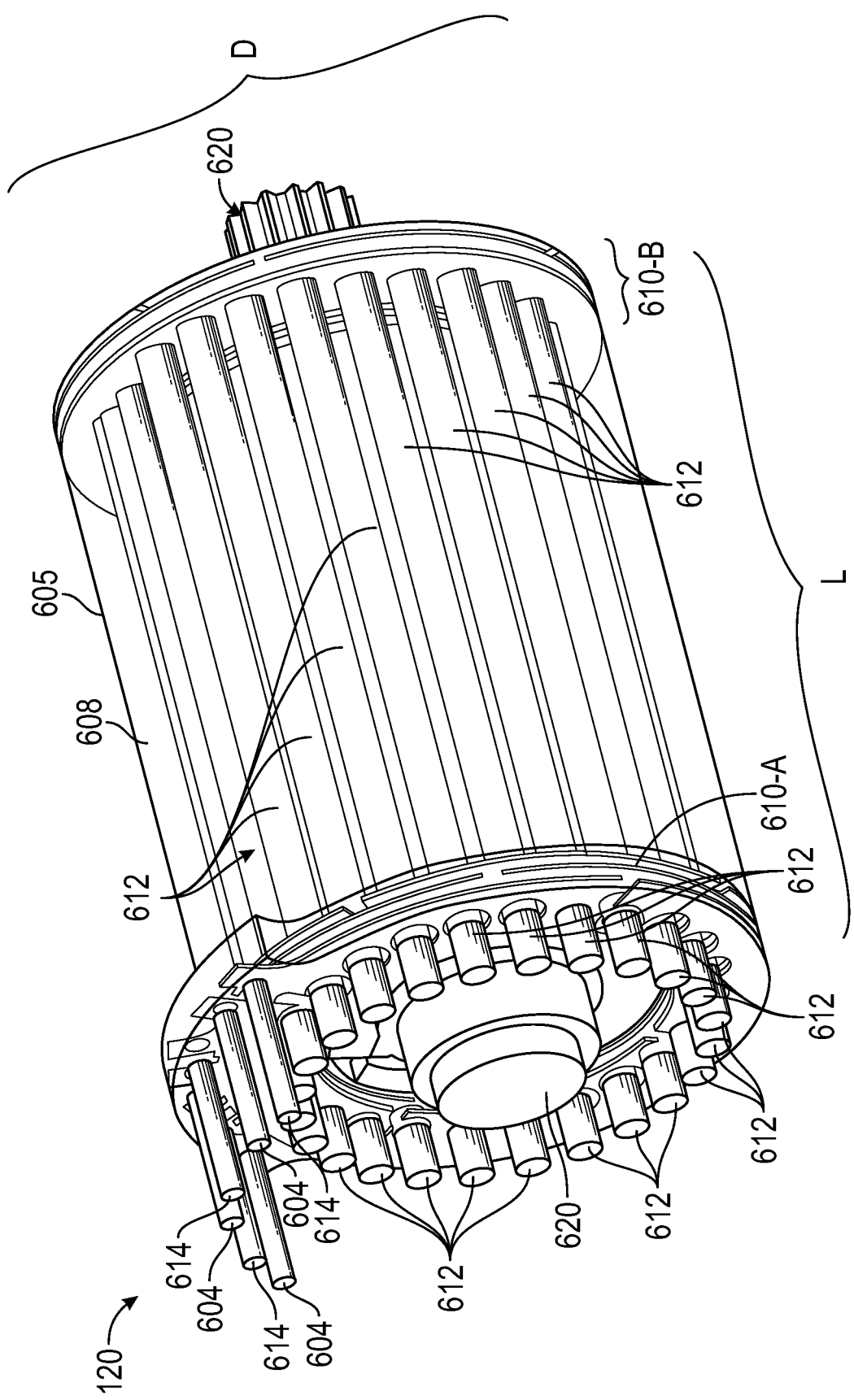
FIGS. 6A and 6B are perspective views that illustrate a low-voltage motor (LVM) in accordance with a non-limiting embodiment.
Figure 6B:
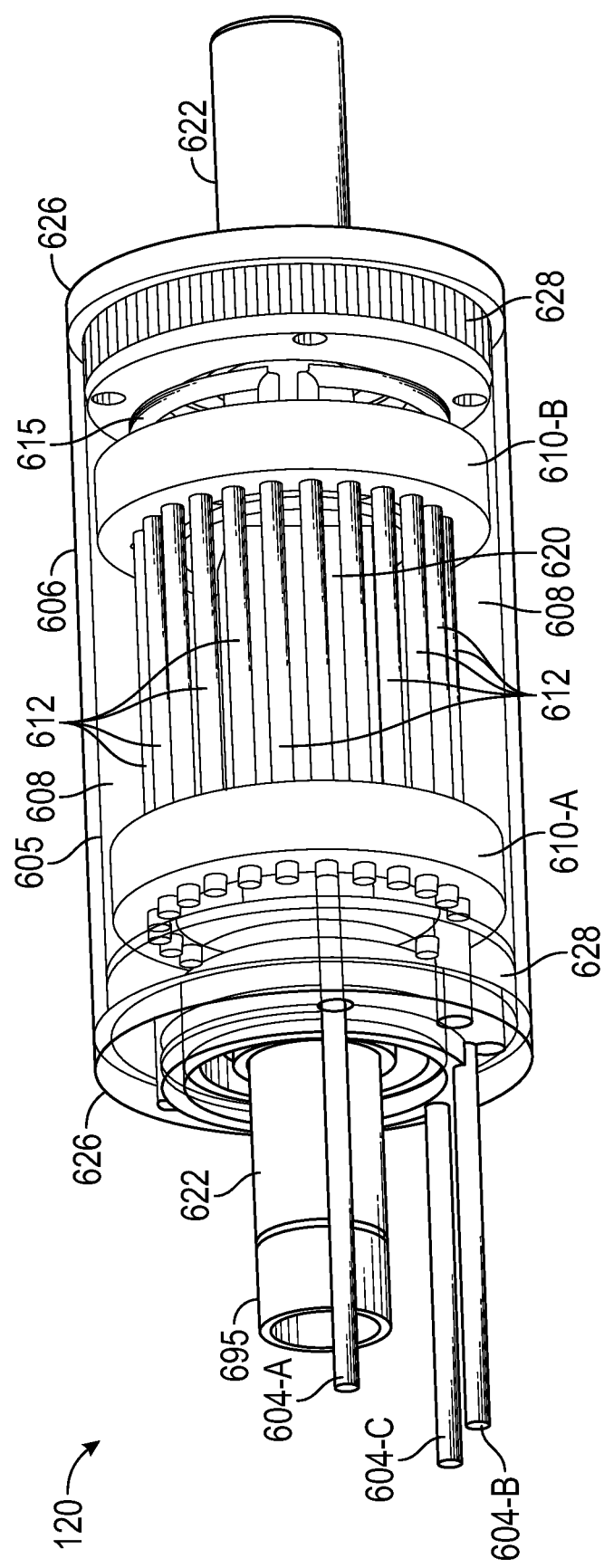
Figure 6C:
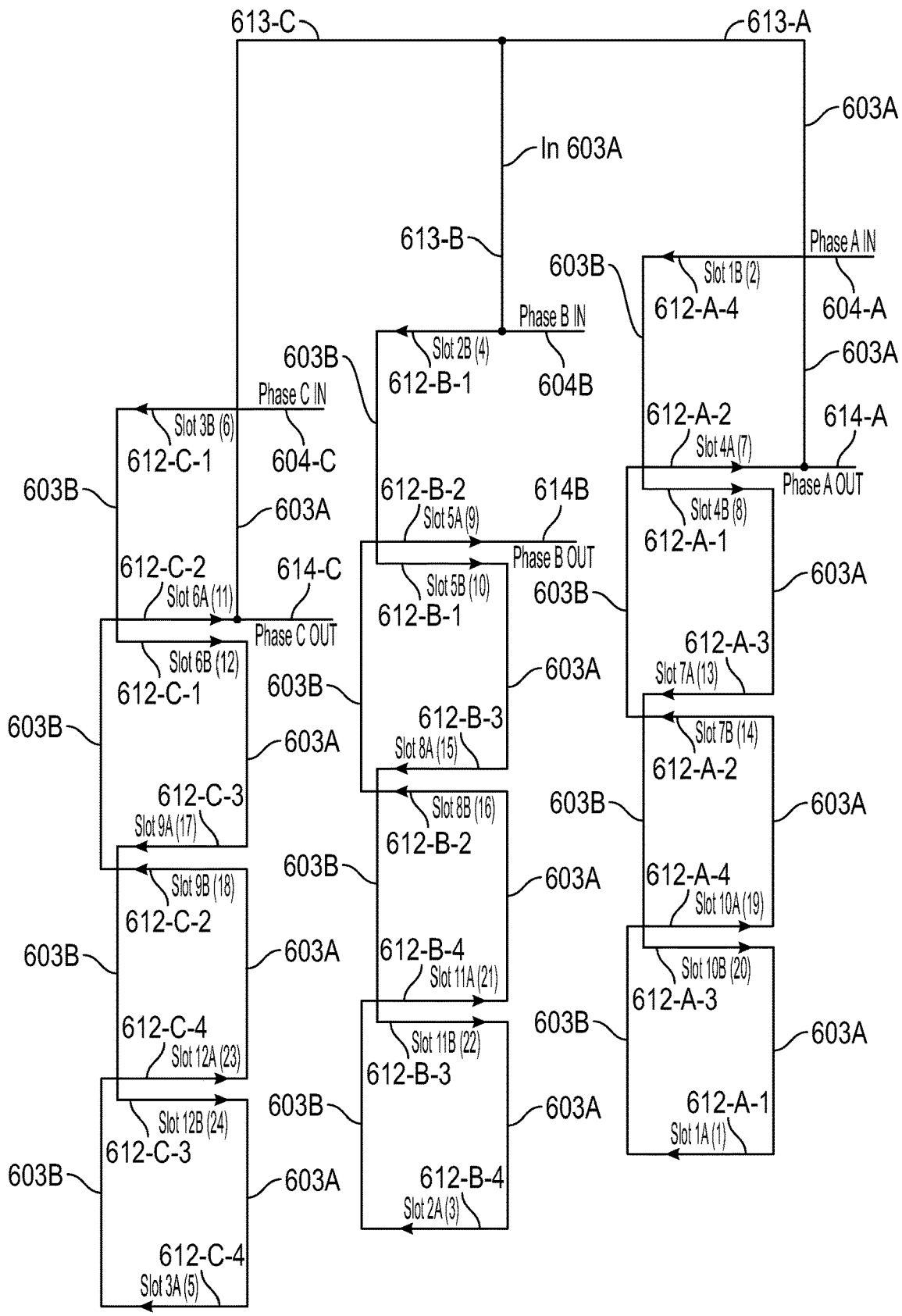
FIG. 6C is a wiring plan that illustrates an arrangement of phase control leads, the single-turn coils and winding connections when the LVM is a three-phase motor in accordance with a non-limiting embodiment.
Figure 6D:
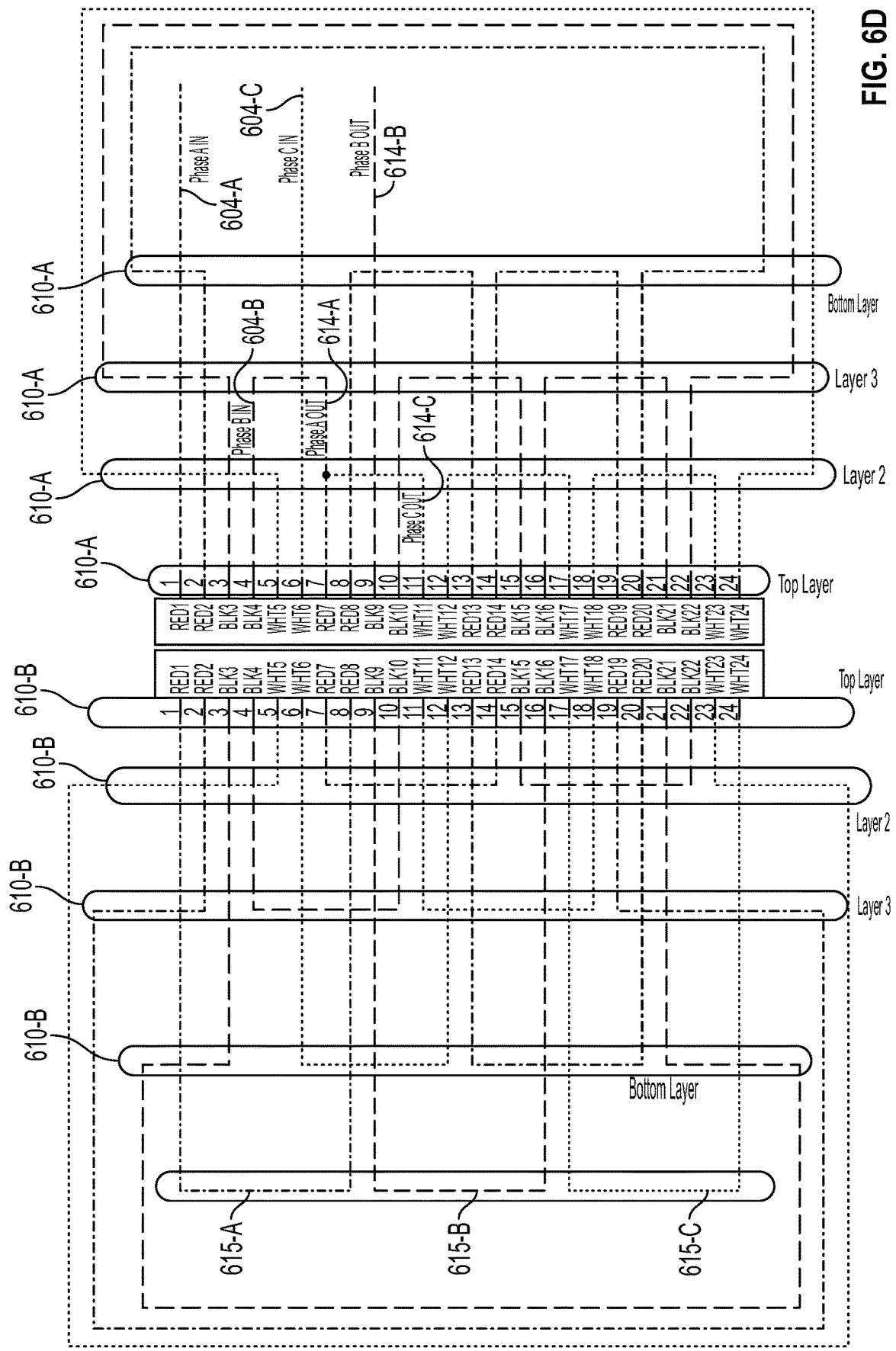
FIG. 6D is a circuit board and wiring plan layout that illustrates an arrangement of the phase control leads, single-turn coils and windings connections when the LVM is a three-phase motor in accordance with a non-limiting embodiment.
Figure 6E:
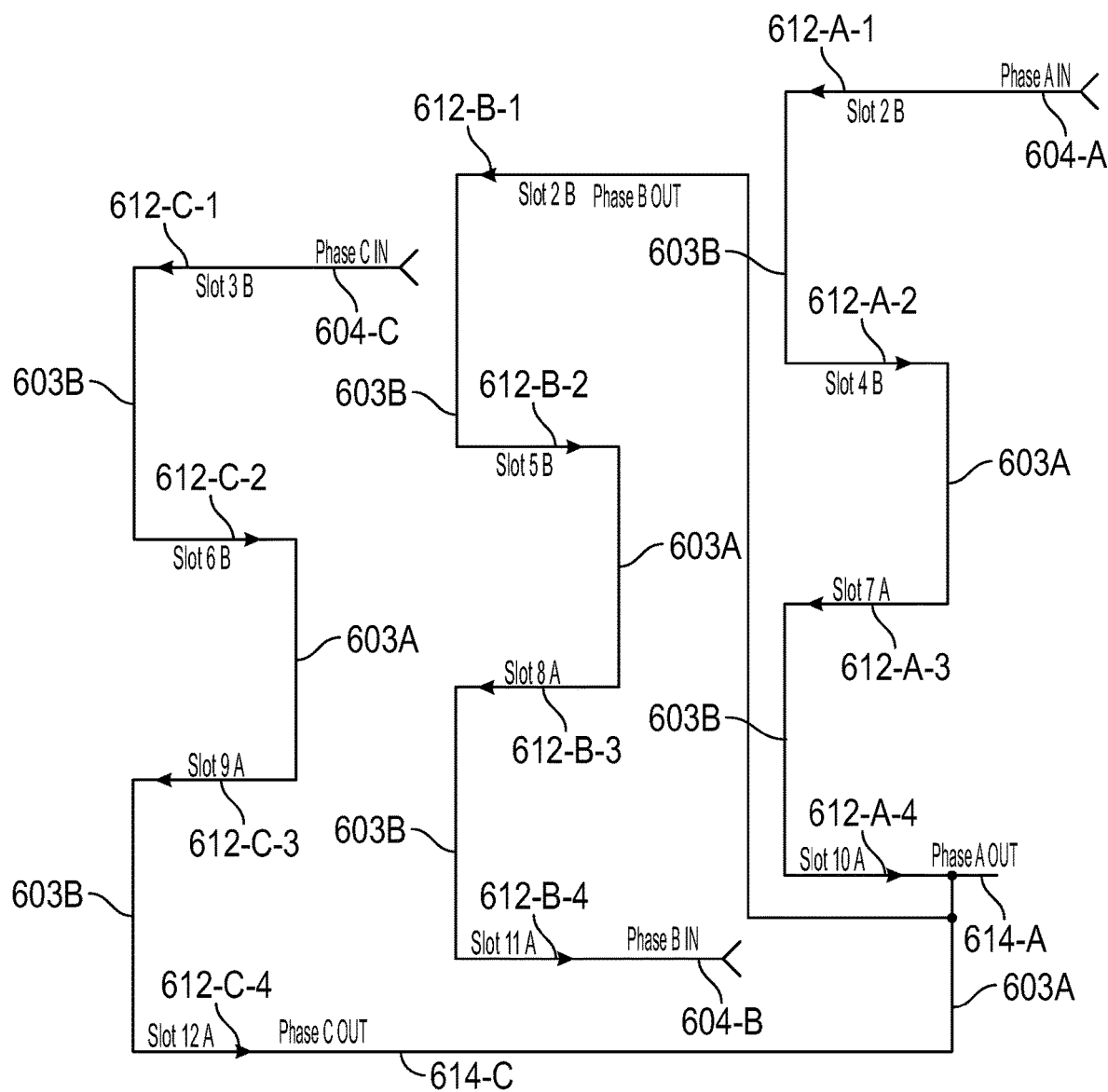
FIG. 6E is a wiring plan that illustrates an arrangement of phase control leads, the single-turn coils and winding connections when the LVM is a three-phase motor in accordance with another non-limiting embodiment.
Figure 6F:
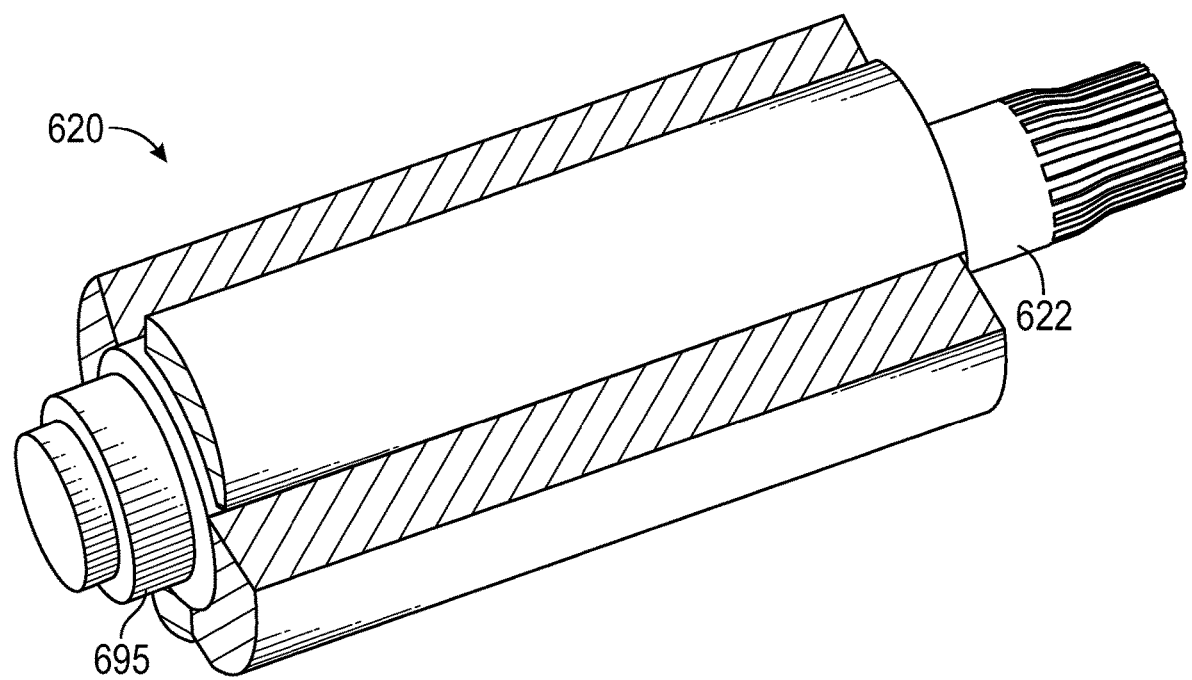
FIG. 6F is a perspective view that illustrates a rotor of the LVM in accordance with a non-limiting embodiment.

FIGS. 6A and 6B are perspective views that illustrate a LVM 120 in accordance with a non-limiting embodiment. FIG. 6C is a wiring plan that illustrates an arrangement of wirings 603A, 603B, phase control input leads 604, conductive rods 612 and winding wye center connections 613 when the LVM 120 is a three-phase motor in accordance with a non-limiting embodiment. FIG. 6D is a circuit board 610 and wiring plan layout that illustrates an arrangement of the wirings (not labeled in FIG. 6D due to space constraints, but in FIG. 6C interlayer wirings of the bottom end turn PCB 610-A are labeled as 603A, and interlayer wirings of the top end turn PCB 610-B are labeled as 603A in FIG. 6C), phase control input leads 604, conductive rods 612 and winding wye center connections 613 when the LVM 120 is a three-phase motor in accordance with a non-limiting embodiment. FIG. 6E is a wiring plan in accordance with another embodiment. FIG. 6F is a perspective view that illustrates a rotor 620 of the LVM 120 in accordance with a non-limiting embodiment. FIGS. 6A-6F will be described together in the description that follows. In this one non-limiting implementation, the LVM 120 is a three-phase motor and therefore includes three phase control input leads 604A . . . 604C for controlling phases A, B and C of the LVM 120. The rotor 620 includes permanent magnets that are used to create the rotor field, and in this non-limiting implementation, the rotor 620 is a four-pole rotor (i.e., two pole pairs). As such, in this embodiment, the LVM 120 is a three-phase, wye-wound, four-pole motor using four full-pitch single-turn coils for each motor phase (i.e., twelve coils in total). However, it should be appreciated that this embodiment is non-limiting, and that the total number of coils, the number of poles and number of phases can vary depending on the implementation. For instance, in another embodiment, the LVM 120 can be a three-phase, six-pole motor and will therefore include eighteen coils in total. As another example, in another embodiment, the LVM 120 can be a three-phase, two-pole motor and will include six coils in total.

In one embodiment, shown in FIGS. 6A, 6B and 6F, the LVM 120 includes phase control input leads 604-A . . . 604-C, a laminated back iron sleeve 605, a motor housing 606, a stator 610, 612, phase control output leads 614-A . . . 614-C, the rotor 620, bearings 628, and motor end caps 626 that secure the stator 610, 612 and the rotor 620 within the motor housing 606. The rotor includes a shaft 622 having a top end and a bottom end, and a current sensor 695 can be attached the top end of the shaft 622.

In one embodiment, the motor housing 606 can be conductive sleeve or tube-like casing that encases the stator 610, 612 and the rotor 620.

The stator comprises a bottom end turn printed circuit board (PCB) 610-A and a top end turn printed circuit board (PCB) 610-B, and a number of single-turn coils (not labeled) that serve as stator windings used to create the stator field. These single-turn coils are referred to as single-turn because the number of conductive loops or coil turns (N) in each single-turn coil is equal to one (1). In one embodiment, conductive rods 612 that make up part of these single-turn coils are supported by cured epoxy potting material 608 that is within the laminated back iron sleeve 605.

The bottom end turn PCB 610-A and the top end turn PCB 610-B are each multi-layer PCBs that have a number of plated through-openings 611 formed in them. In the embodiment illustrated in FIG. 6D, the bottom end turn PCB 610-A and top end turn PCB 610-B can each be a printed wiring assembly that comprises four layers of printed wiring boards. FIG. 6D is a wiring schematic that provides instructions regarding how to conductive rods are to be routed through in the two, four-layer circuit boards 610-A, 610-B. The bottom end turn PCB 610-A and top end turn PCB 610-B each have interlayer wirings 603A, 603B formed therein (not visible in FIG. 6A or 6B) that are used to connect conductive rods that make up the single-turn coils. In other words, the single-turn coils are formed by the wirings 603A of the bottom end turn PCB 610-A, the wirings 603B of the top end turn PCB 610-B, and conductive rods 612 disposed in the plated through-openings 611.

For example, in one non-limiting embodiment, shown for example in FIGS. 6A and 6B, each of the conductive rods 612 that are part of the single-turn coils is a single insulated rod-shaped conductor (e.g., straight wires) that run through the stator and terminate onto PCBs 610 at either end of the stator. For instance, in one implementation, the bottom end turn PCB 610-A has a number of "first" interlayer wirings 603A formed therein and a number of "first" plated through-openings 611 formed therein, and the top end turn PCB 610-B has a number of "second" interlayer wirings 603B formed therein and a number of "second" plated through-openings 611 formed therein. In this case, each single-turn coil can include a first conductive rod 612 being disposed in one of the first plated through-openings 611 and one of the second plated through-openings 611, a second conductive rod 612 being disposed in another one of the first plated through-openings 611 and another one of the second plated through-openings 611, and one of the interlayer wirings 603 (e.g., either one of the first wirings 603A or one of the second wirings 603B) connects the first and second conductive rods 612 to make up that single-turn coil.

In one embodiment, illustrated in FIGS. 6C and 6D, each of the end turn PCBs 610-A, 610-B includes twenty-four through vias or plated through-openings 611 that serve to hold conductive rods 612 that are part of the single-turn coils. In FIG. 6D, the plated through-openings are labeled using numbers 1 . . . 24. Table 1 explains how the slots from FIG. 6C map to a corresponding one of the plated through-openings 611 in each of the end turn PCBs 610-A, 610-B that is illustrated in FIG. 6D.

TABLE 1

| Slot From FIG. 6C | Reference Number From FIG. 6C | Number of Corresponding Plated Through-Opening In End Turn PCBs 610-A, 610-B of FIG. 6D | Corresponding Single Turn Coil and Phase As Viewed From Bottom End Turn PCB 610-A |
|---|---|---|---|
| Slot 1A | 612-A-1 | 1 | Phase A, Coil 1 In |
| Slot 1B | 612-A-4 | 2 | Phase A, Coil 4 In |
| Slot 2A | 612-B-4 | 3 | Phase B, Coil 4 In |
| Slot 2B | 612-B-1 | 4 | Phase B, Coil 1 In |
| Slot 3A | 612-C-4 | 5 | Phase C, Coil 4 In |
| Slot 3B | 612-C-1 | 6 | Phase C, Coil 1 In |
| Slot 4A | 612-A-2 | 7 | Phase A, Coil 2 Out |
| Slot 4B | 612-A-1 | 8 | Phase A, Coil 1 Out |
| Slot 5A | 612-B-2 | 9 | Phase B, Coil 2 Out |
| Slot 5B | 612-B-1 | 10 | Phase B, Coil 1 Out |
| Slot 6A | 612-C-2 | 11 | Phase C, Coil 2 Out |
| Slot 6B | 612-C-1 | 12 | Phase C, Coil 1 Out |
| Slot 7A | 612-A-3 | 13 | Phase A, Coil 3 In |
| Slot 7B | 612-A-2 | 14 | Phase A, Coil 2 In |
| Slot 8A | 612-B-3 | 15 | Phase B, Coil 3 In |

TABLE 1-continued

| Slot From FIG. 6C | Reference Number From FIG. 6C | Number of Corresponding Plated Through-Opening In End Turn PCBs 610-A, 610-B of FIG. 6D | Corresponding Single Turn Coil and Phase As Viewed From Bottom End Turn PCB 610-A |
|---|---|---|---|
| Slot 8B | 612-B-2 | 16 | Phase B, Coil 2 In |
| Slot 9A | 612-C-3 | 17 | Phase C, Coil 3 In |
| Slot 9B | 612-C-2 | 18 | Phase C, Coil 2 In |
| Slot 10A | 612-A-4 | 19 | Phase A, Coil 4 Out |
| Slot 10B | 612-A-3 | 20 | Phase A, Coil 3 Out |
| Slot 11A | 612-B-4 | 21 | Phase B, Coil 4 Out |
| Slot 11B | 612-B-3 | 22 | Phase B, Coil 3 Out |
| Slot 12A | 612-C-4 | 23 | Phase C, Coil 4 Out |
| Slot 12B | 612-C-3 | 24 | Phase C, Coil 3 Out |

In this particular embodiment, where the LVM 120 is a three-phase motor, each of the 3-phases of the stator will include four single-turn coils. As shown in FIG. 6C, each phase winding includes four single-turn coils that are connected together in series. Each single-turn coil corresponds to (or addresses) one of the magnets of the four-pole rotor. In any phase, the four single-turn coils are connected such that the magnetic field in the first and third coils will be of one magnetic polarity (e.g. "north") and the magnetic field of the second and third coils will have the opposite magnetic polarity (e.g., "south"). Eight of the twenty-four plated through-openings 611 on each of the end turn PCBs 610-A, 610-B are assigned to each phase A, B, C. As shown in FIG. 6C, for phase A, there is a phase A control input lead 604-A, phase A control output lead 614-A, and four single-turn coils that each consist of two conductive rods: 612-A-1, 612-A-2, 612-A-3, 612-A-4 connected by a interlayer wiring 603A or 603B. The arrow that is superimposed shows the direction of current flow.

In the example shown in FIG. 6C, there are 24 plated through-openings 611 on each of the end turn PCBs 610-A, 610-B that are grouped into 12 pairs (e.g., plated through-openings 1A, 1B, 2A, 2B, etc.).

As illustrated in FIG. 6D, the phase A control input lead 604-A is inserted in plated through-opening 1 of the bottom end turn PCB 610-A. The conductive rods 612-A that make up the four single-turn coils for phase A will be disposed in plated through-openings. For phase A, the first coil is formed by conductive rods 612-A-1 at plated through openings 1 to 8 of top end turn PCB 610-B; the second coil is formed by conductive rods 612-A-2 at plated through openings 14 to 7 of top end turn PCB 610-B; the third coil is formed by conductive rods 612-A-3 at plated through openings 13 to 20 of top end turn PCB 610-B; the fourth coil is formed by conductive rods 612-A-4 at plated through openings 2 to 19 of top end turn PCB 610-B, and phase A control output lead 614-A exits from plated through-opening 7 of the bottom end turn PCB 610-A.

Phase B control input lead 604-B is inserted in plated through-opening 4 of the bottom end turn PCB 610-A. The conductive rods 612-B that make up the four single-turn coils for phase B will be disposed in plated through-openings. For phase B, the first coil is formed by conductive rods 612-B-1 at plated through openings 4 to 10 of top end turn PCB 610-B; the second coil is formed by conductive rods 612-B-2 at plated through openings 16 to 9 of top end turn PCB 610-B; the third coil is formed by conductive rods 612-B-3 at plated through openings 15 to 22 of top end turn PCB 610-B; the fourth coil is formed by conductive rods 612-B-4 at plated through openings 3 to 21 of top end turn PCB 610-B, and phase B control output lead 614-B exits from plated through-opening 9 of the bottom end turn PCB 610-A.

Phase C control input lead 604-C is inserted in plated through-opening 6 of the bottom end turn PCB 610-A. The conductive rods 612-C that make up the four single-turn coils for phase C will be disposed in plated through-openings. For phase C, the first coil is formed by conductive rods 612-C-1 at plated through openings 6 to 12 of top end turn PCB 610-B; the second coil is formed by conductive rods 612-C-2 at plated through openings 18 to 11 of top end turn PCB 610-B; the third coil is formed by conductive rods 612-C-3 at plated through openings 17 to 24 of top end turn PCB 610-B; the fourth coil is formed by conductive rods 612-C-4 at plated through openings 5 to 23 of top end turn PCB 610-B, and, and phase C control output lead 614-C exits from plated through-opening 11 of the bottom end turn PCB 610-A.

In the example shown in FIG. 6C, each of the single-turn coils are connected by interlayer wirings 603A, 603B of the end turn PCBs 610-A, 610-B and thus not visible in FIG. 6A. The conductive rods 612 that make up part of each single-turn coil are inserted through two plated through-openings 611 in each of the end turn PCBs 610-A, 610-B such that the plated through-openings 611 collectively hold 24 conductive rods that make up part of the twelve single-turn coils of the LVM 120. Winding connections 613-A . . . 613-C connect phase A control output lead 614-A, phase B control output lead 614-B and phase C control output lead 614-C in wye configuration.

In some implementations, for example for smaller motors, it may be desirable to use fewer conductive rods 612 in the LVM 120. FIG. 6E is a wiring plan that illustrates an arrangement of interlayer wirings 603A, 603B, phase control input leads 604, the conductive rods 612 and winding connections 613 when the LVM 120 is a three-phase motor in accordance with another embodiment. This embodiment is similar to the one illustrated in FIG. 6C except that a given conductive rod (612) is part of two single-turn coils for a given phase. For example, consider conductive rod 612-A-2 in FIG. 6E. This rod is the current-out for both Phase A Coil 1 and Phase A Coil 2. This arrangement has merit for simplicity, but with the consequence that the current in rod 612-A-2 must be double that of the scheme depicted in FIG. 6C for the same motor performance. Table 2 explains how the slots from FIG. 6E map to a corresponding phase and coil.

TABLE 2

| Slot From FIG. 6E | Reference Number From FIG. 6E | Corresponding Single Turn Coil and Phase As Viewed From 603A Side in FIG. 6E |
|---|---|---|
| Slot 1 | 612-A-1 | Phase A, Coil 1 In, Coil 4 In |
| Slot 2 | 612-B-1 | Phase B, Coil 1 In, Coil 4 In |
| Slot 3 | 612-C-1 | Phase C, Coil 1 In, Coil 4 In |
| Slot 4 | 612-A-2 | Phase A, Coil 1 Out, Coil 2 Out |
| Slot 5 | 612-B-2 | Phase B, Coil 1 Out, Coil 2 Out |
| Slot 6 | 612-C-2 | Phase C, Coil 1 Out, Coil 2 Out |
| Slot 7 | 612-A-3 | Phase A, Coil 2 In, Coil 3 In |
| Slot 8 | 612-B-3 | Phase B, Coil 2 In, Coil 3 In |
| Slot 9 | 612-C-3 | Phase C, Coil 2 In, Coil 3 In |
| Slot 10 | 612-A-4 | Phase A, Coil 3 Out, Coil 4 Out |
| Slot 11 | 612-B-4 | Phase B, Coil 3 Out, Coil 4 Out |
| Slot 12 | 612-C-4 | Phase C, Coil 3 Out, Coil 4 Out |

In this embodiment (FIG. 6E), each of the end turn PCBs (not illustrated) would include twelve plated through-openings 611, and four of the twelve plated through-openings 611 on each of the end turn PCBs are assigned to each phase. As shown in FIG. 6E, for phase A, there are 3 phase control leads, 604-A, 604-B, and 604-C for motor phases A, B, and C, respectively. The center wye connection would be part of a bottom printed wiring assembly and is the connection of Phase A Out, Phase B In, and Phase C Out.

As will be explained below, the disclosed stator structure can improve efficiency per unit volume, while also making manufacturing easier. To explain further, a motor generates torque from the interaction of the permanent magnets in the rotor and the Lorentz force caused by electrical current in the stator coils. For a given size motor, the magnetomotive force generated in the stator is the product the number of turns in the coils and current in those coils. The force is magnified by the number of turns in the stator coils 602, and is quantified in units of ampere-turns.

For example, the torque produced by a BLDC motor can be expressed as:

$$\tau = 2 B_g L_{st} R_{ro} N\, i,$$

where $B_g$=magnetic flux in the air gap between the stator and rotor $L_{st}$=axial length of the rotor stator $R_{ro}$=the outside diameter of the rotor N=number of turns in a stator coil i=the current in the coil.

Thus, for a given motor size and magnet material, the torque is directly proportional to the product of number of coil turns (N)×the current, or N×i.

A motor's efficiency per unit volume is directly proportional to a stator "fill-factor," which is the percentage of conductors filling the stator slots. The higher the fill-factor the higher the motor constant will be. In a conventional motor, the fill-factor can be defined as the ratio of bare, uninsulated wire in a stator slot to the area of that slot (e.g., ratio of conductor area of the coils filling the stator slots to total area of the stator slots). As motors decrease in size, it is increasingly difficult to pack windings into the stator slots because less space is available.

A traditional motor stator has coils made of multiple turns of insulated wire. For example, many traditional small motors (e.g., less than 100 watts input power) typically have 10 to 30 turns in a stator coil. However, as power levels increase past a certain power level (e.g., 150 watts), these small motors are no longer feasible. The insulation on the wires starts to become a significant percentage of the stator slot volume, and therefore, the wire insulation and void spaces between wires limit the fill-factor. In small motors (e.g., those that are less than an inch in diameter), it becomes very difficult to achieve a fill-factor of even 50% to 60%. Another drawback of such motors is that they are difficult to manufacture due to significant amounts skilled labor required.

In accordance with the disclosed embodiments, the stator windings are single-turn coils running thru the plated through-openings 611. Because the number (N) of turns in each coil of the LVM 120 is the minimum limit of one turn, the current (i) in the LVM 120 must be proportionately higher to generate the needed torque. For example, for the LVM 120 to produce an equivalent torque as traditional motors where each coil has 10 to 30 turns, the current in the LVM 120 must be 10 to 30 times greater, albeit at very low voltage. For this reason, as described above, the higher power LVM 120 can be driven by a variable current source 108 that is capable of generating current 117 on the order of hundreds of amperes and that is closely, mechanically coupled to the LVM 120. The range of the variable current 117 generated by the variable current source 108 can vary depending on the particular implementation and specific structure of the LVM 120 (e.g., a larger version of the LVM will require more current than a smaller version of the LVM). For example, depending on the implementation of the variable current source 108, the variable current 117 can vary between 10 and 150 amperes. Further, for any specific variable current source 108 and LVM 120, the current generated the variable current 117 generated by the variable current source 108 can vary depending on the element being driven (e.g., an actuator) and the demands it places on the LVM 120 at any particular operating point. For instance, in some implementations, where the LVM 120 is powered using a low voltage source, the variable current source 108 can deliver 25-75 amperes of current 117 at very low voltage. This can allow for the LVM 120 to be powered using a low voltage source (e.g., 4 to 16 volt battery). In one implementation where a buck converter is used, this variable current source 108 can have greater than 85% conversion efficiency when powered from a low voltage source.

Copper fill factor in the stator of a motor is directly related to the efficiency of that motor. Copper fill factor in a motor stator is the ratio of the stator cross sectional area containing copper to the cross sectional area containing ferrous metal. By convention fill factor is generally expressed as a percent. The improvement in efficiency is simply due to a reduction in the I2R loses in the stator if a higher percentage of the stator is filled with conductive copper, hence achieving a lower resistance. Traditionally built small motors (for example 1 inch diameter or less) have poor fill factors (generally <50%) due to the limitation of packing multi-turn coils into the stator slots, and the volume taken up by insulation on the wire. However, in the LVM 120 specifically, and single turn coil stator concept in general, fill factors are much higher. In one non-limiting embodiment the LVM 120 has a fill factor of 65%, and in another embodiment a LVM having a stator with single-turn-coils has a fill factor of 85%. The conductive rods of LVM 120 are not limited to a circular cross section. In this design the conductive rods can be wedge shaped, rectangular, or other shapes that increase the stator fill factor. The cross section of the conductive rods for LVM 120 is not limited by the requirements of winding equipment or the ability to stuff wires into a stator slot as would be the case for a traditionally constructed motor stator.

Another advantage of the LVM 120 is that it can be readily manufactured at a much lower cost than conventional BLDC motors. The manufacturability of the LVM 120 is also greatly improved because the LVM 120 is much easier to assemble than conventional motors having stators with multi-turn wound wire coils. Because the LVM 120 includes straight wires 612 that are run through the stator and that terminate onto end turn PCBs 610 on either end of the stator, the LVM 120 does not require any winding of the stator. As will be described below with reference to FIGS. 7A-7T, this method of manufacturing a small, yet efficient LVM 120 is feasible and economical. It is estimated that the manufacturing cost of the LVM 120 will be approximately 20% of the cost of a traditionally wound motor due to a greatly reduced need for skilled assembly labor.

Figure 7A:
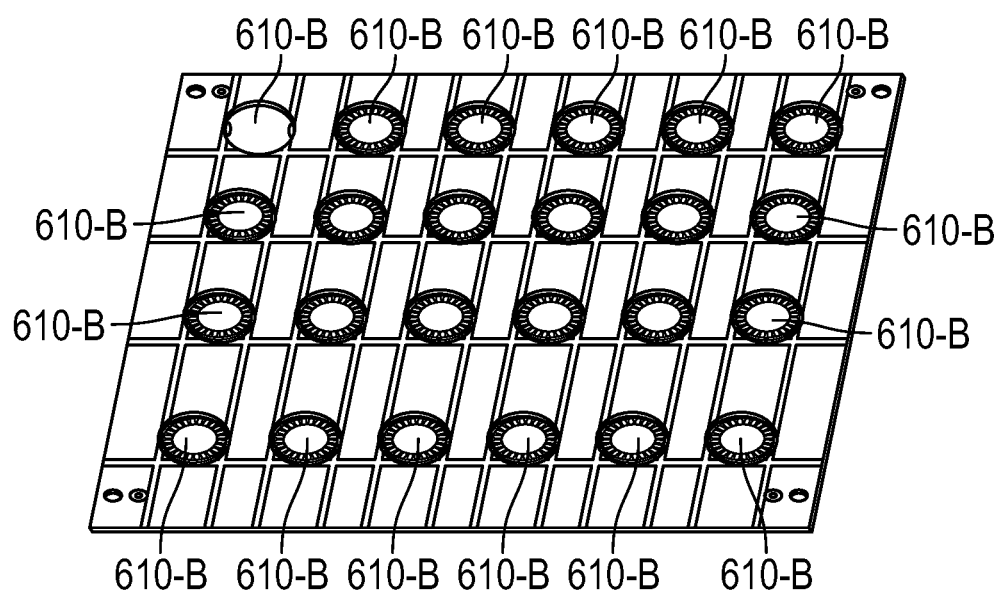
FIGS. 7A-7S illustrate a method for manufacturing a LVM in accordance with a non-limiting embodiment.

FIGS. 7A-7T illustrate a method for manufacturing a LVM 120 in accordance with a non-limiting embodiment. FIGS. 7A-7T will be described with continued reference to FIGS. 6A-6F.

Figure 7B:
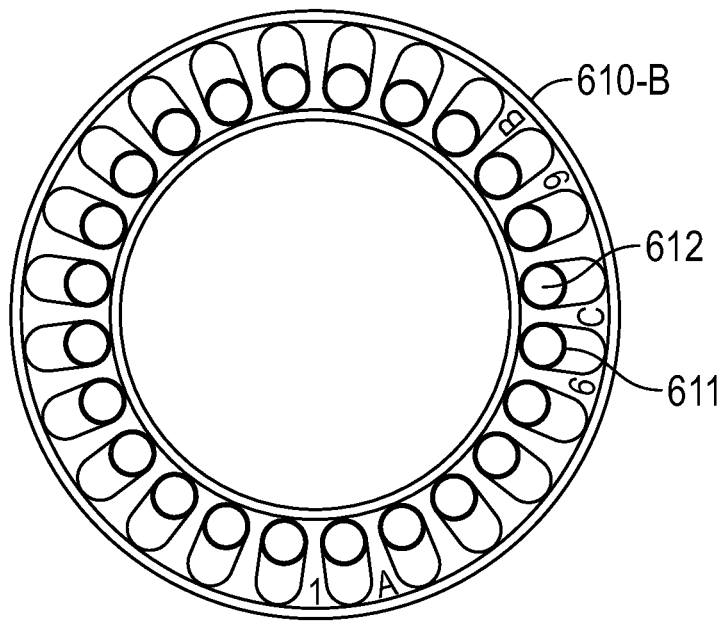
Figure 7C:
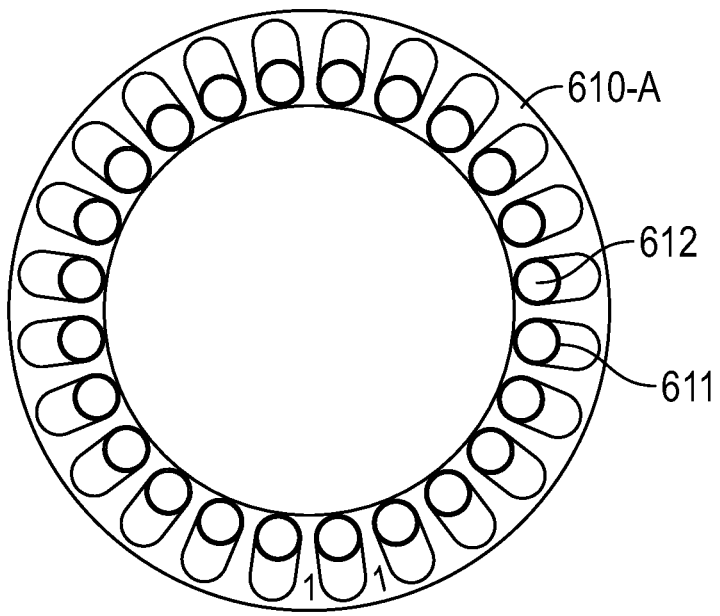

As shown in FIG. 7A, construction and assembly of the LVM 120 can begin with a four-layer copper printed circuit board (PCB) having twenty-four end turn PCBs 610 patterned therein. In particular, FIG. 7A shows twenty-four top end turn PCBs 610-B. FIG. 7B illustrates an example of one top end turn PCB 610-B that has twenty-four plated through-openings 611, whereas FIG. 7C illustrates an example of one bottom end turn PCB 610-A that has twenty-four plated through-openings 611. It should be noted that although the top end turn PCB 610-B and the bottom end turn PCB 610-A look the same in the views illustrated in FIGS. 7B and 7C their internal wiring structure (i.e., between layers) is different so that when the conductive rods 612 are inserted through the plated through-openings 611 the internal wirings of the circuit boards will connect the conductive rods 612 to form single-turn coils.

Figure 7D:
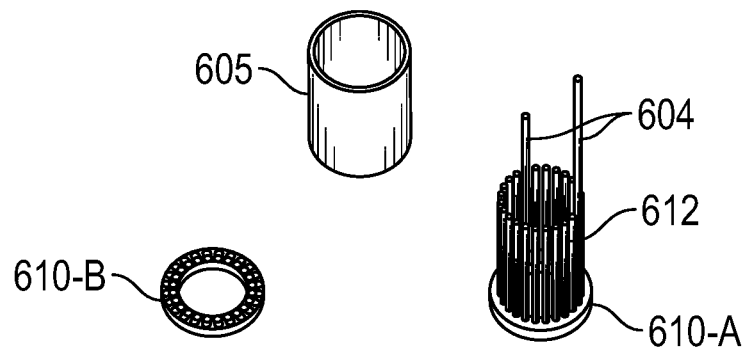
Figure 7E:
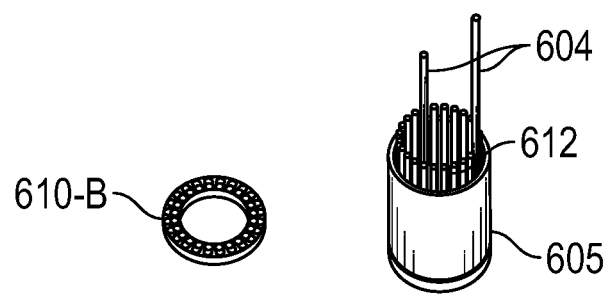

FIG. 7D illustrates a jig 710, 720, 730 that is used to aid soldering the conductive rods 612 onto a bottom end turn PCB 610-A. FIG. 7D illustrates a laminated back iron sleeve 605, a top end turn PCB 610-B and the bottom end turn PCB 610-A having the conductive rods 612 inserted in the plated through-openings 611 and soldered securely in place along with the phase control input wires 604. Once the conductive rods 612 have been soldered into the plated through-openings 611 of the bottom end turn PCB 610-A, the laminated back iron sleeve 605 is place over the conductive rods 612 as shown in FIG. 7E.

Figure 7F:
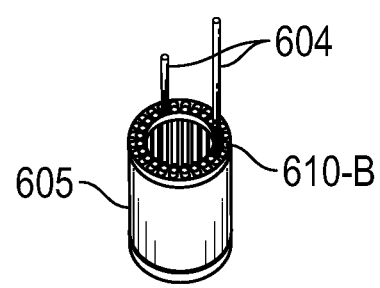
Figure 7G:
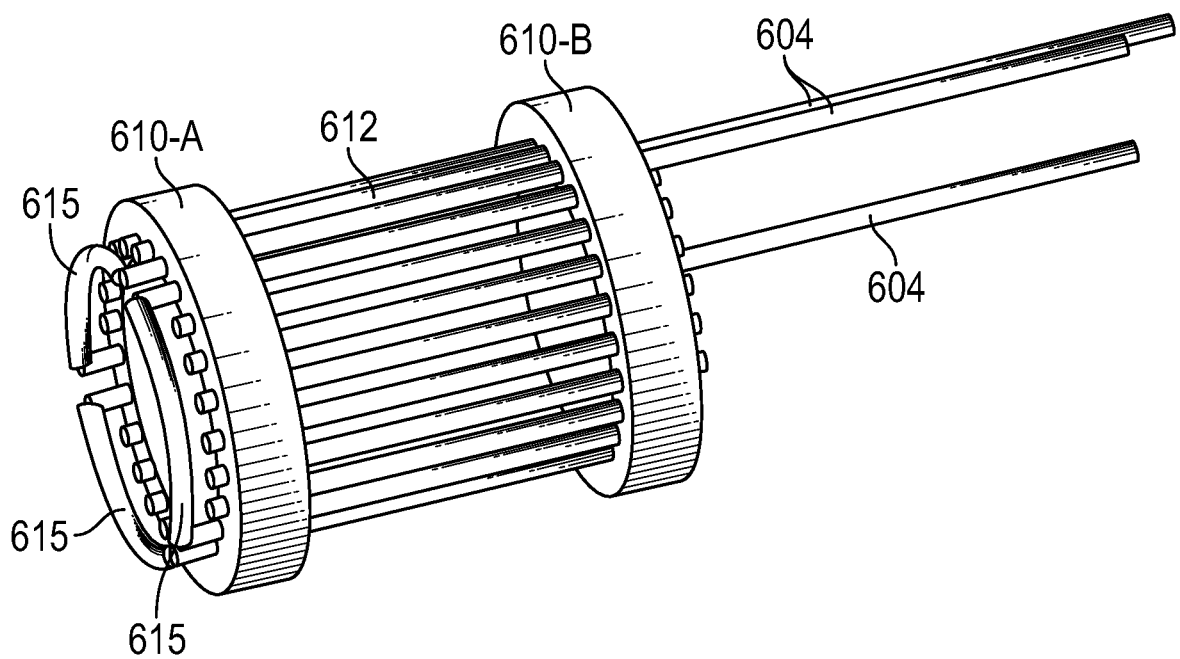

The plated through-openings 611 of the top end turn PCB 610-B can then be aligned with the other ends of the conductive rods 612, which can be inserted into the plated through-openings 611 of the top end turn PCB 610-B. Once the other ends of the conductive rods 612 have been inserted into one of the plated through-openings 611 of the top end turn PCB 610-B, they can be soldered in place at the top end turn PCB 610-B, as shown in FIG. 7F, to create the stator assembly. Wirings 603A, 603B within the bottom end turn PCB 610-A and the top end turn PCB 610-B are arranged so that each of the conductive rods 612 is connected to another one of the conductive rods 612 to thereby form one of the single-turn coils. The only exception is that six of the conductive rods 612 are connected in pairs using external wirings 615, where each of the external wirings 615 connects two of the conductive rods as shown in FIG. 7G. FIG. 7G is a CAD drawing that illustrates some components of the stator including the phase control input wires 604, and the conductive rods 612 that have been inserted into the top end turn PCB 610-B and the bottom end turn PCB 610-A. The laminated back iron sleeve 605 is omitted in FIG. 7H for illustration purposes so that the structure of the conductive rods 612 and end turn PCBs 610-A, 610-B can be clearly viewed.

Figure 7H:
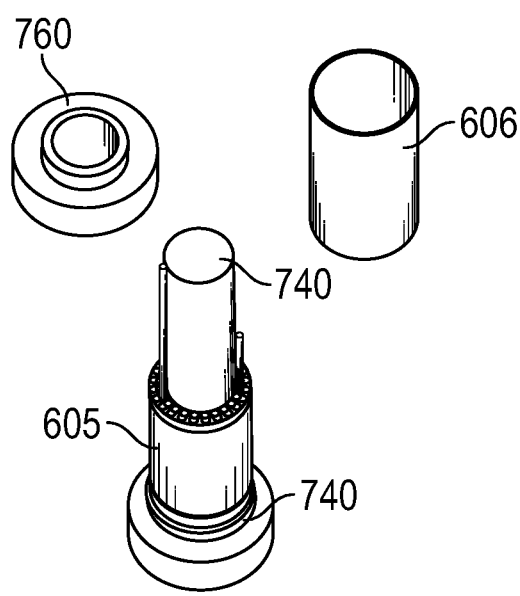
Figure 7I:
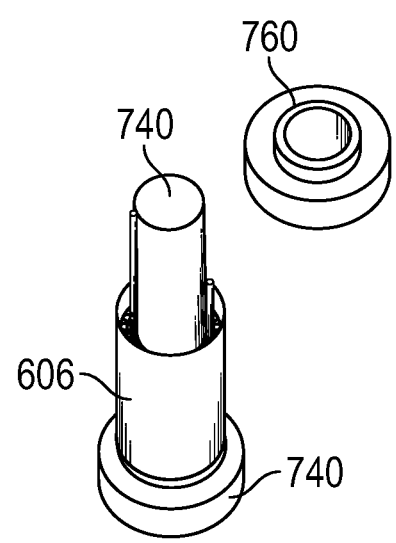
Figure 7J:
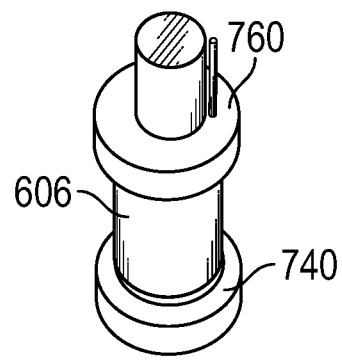
Figure 7K:
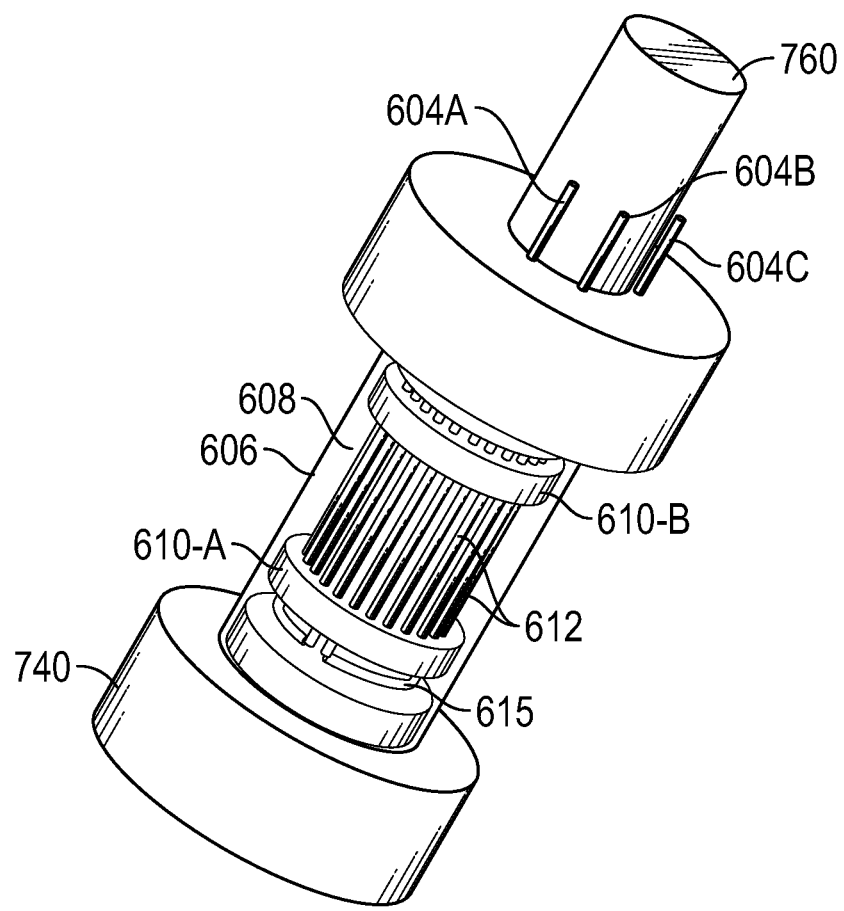

Next the stator assembly is potted as shown in FIGS. 7H through 7K. This step helps ensure concentricity of the stator bore to the motor case. This is important because it allows for very close tolerances between the inner diameter of the stator and outer diameter of the rotor 620, which allows for the air gap between the rotor 620 and stator to be very small (<0.010"). Ensuring that the air gap is small improves the magnetic circuit of the LVM 120, and hence, improves the motor's efficiency. To begin the potting phase, the stator assembly is placed on a Teflon mandrel 740 as shown in FIG. 7H. The motor housing 606 is then inserted over the mandrel 740 such that is surrounds and encases the laminated back iron sleeve 605 and other parts of the stator assembly as shown in FIG. 7I, and epoxy potting material is poured over the stator assembly such the top end turn board 610-B is barely covered. Then, as shown in FIG. 7J, a mandrel top piece 760 is attached to the mandrel 740, and the resulting assembly of FIG. 7J is placed in an oven to cure the epoxy potting material. FIG. 7K is another CAD drawing that illustrates the mandrel 740, 760 and some components of the stator assembly including the phase control input wires 604-A . . . 604C, a transparent view of the motor housing 606, the wires 612 of the single-turn coils 602, the top end turn PCB 610-B and the bottom end turn PCB 610-A.

Figure 7L:
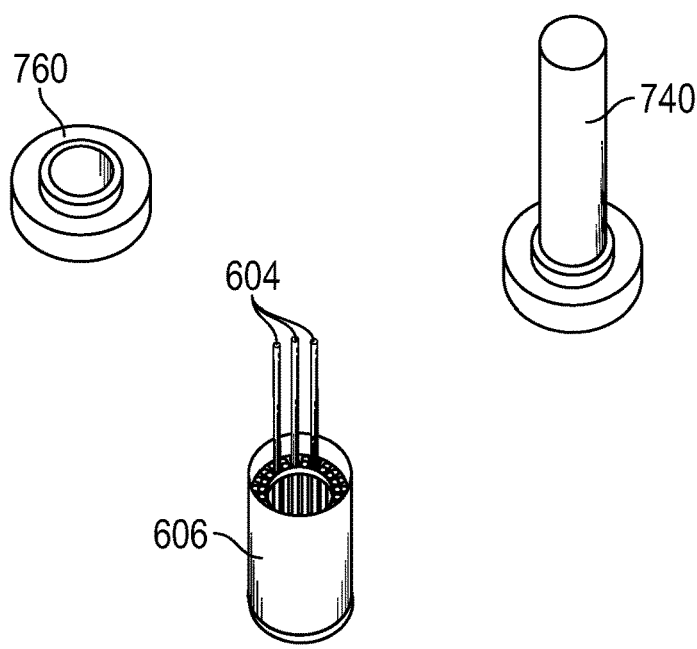
Figures 7M, 7N:
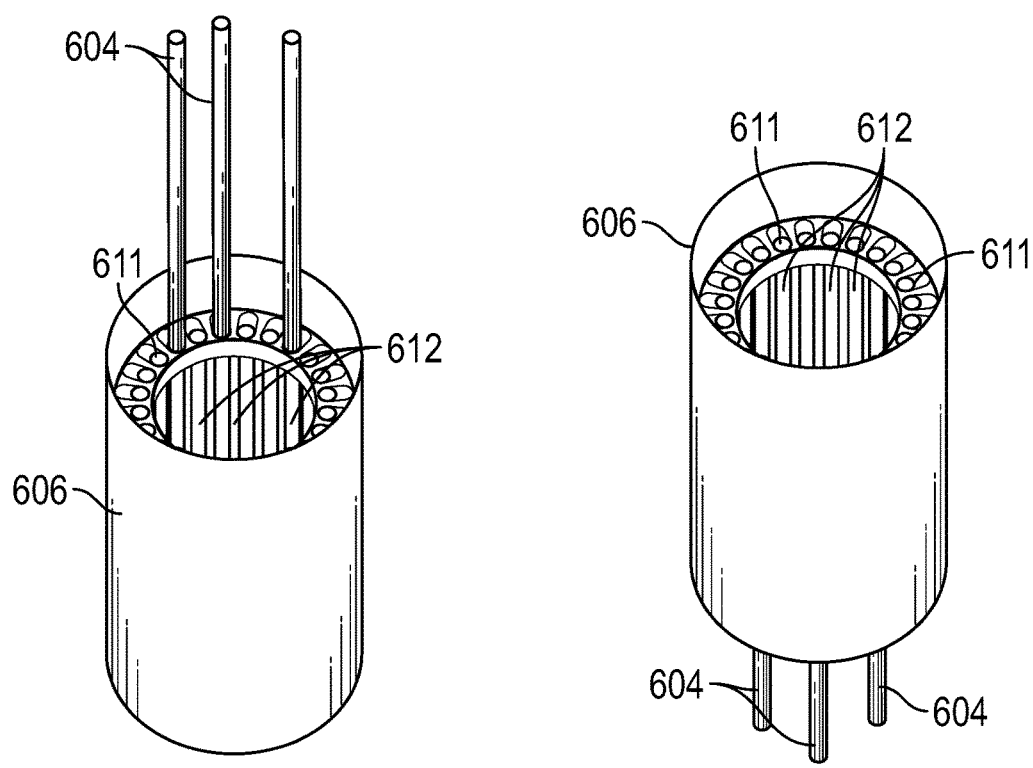

After the epoxy potting material has cured, the assembly of FIG. 7J is removed from the oven and the mandrel 740, 760 is removed from the stator assembly. As shown in FIGS. 7L through 7N, at this stage the stator in completely bonded into the motor housing 606. To illustrate the small size of the stator assembly FIG. 7L illustrates the stator assembly next to a U.S. quarter dollar coin that has a diameter of approximately 24.3 mm, and the width of approximately 1.8 mm. FIG. 7M illustrates a top view of the stator assembly that shows the cured epoxy, the phase control input wires 604, the motor housing 606, and some the conductive rods 612 that are encased in the cured epoxy. FIG. 7N illustrates a bottom view of the stator assembly that shows the cured epoxy and the motor housing 606 along with some the conductive rods 612 that are encased in the cured epoxy.

Figure 7O:
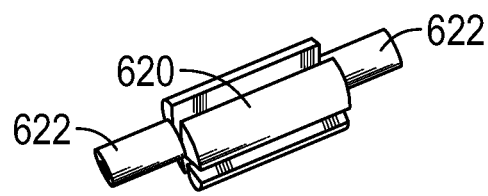
Figure 7P:
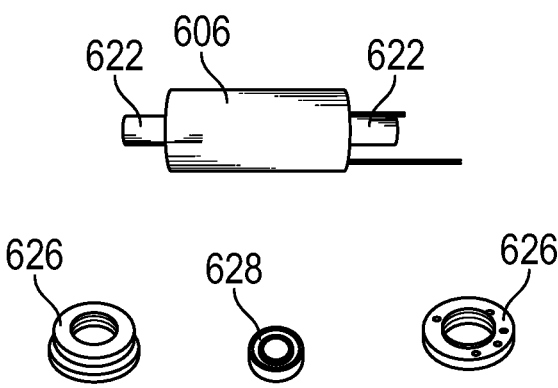
Figure 7Q:
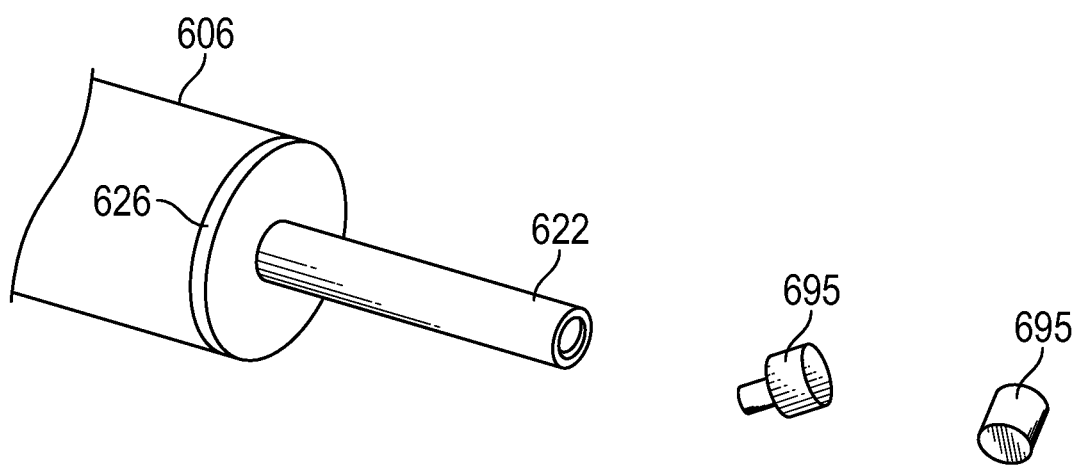
Figure 7R:
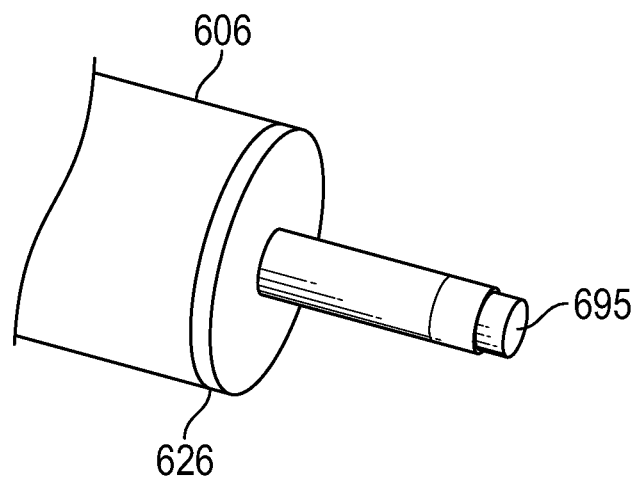
Figure 7S:
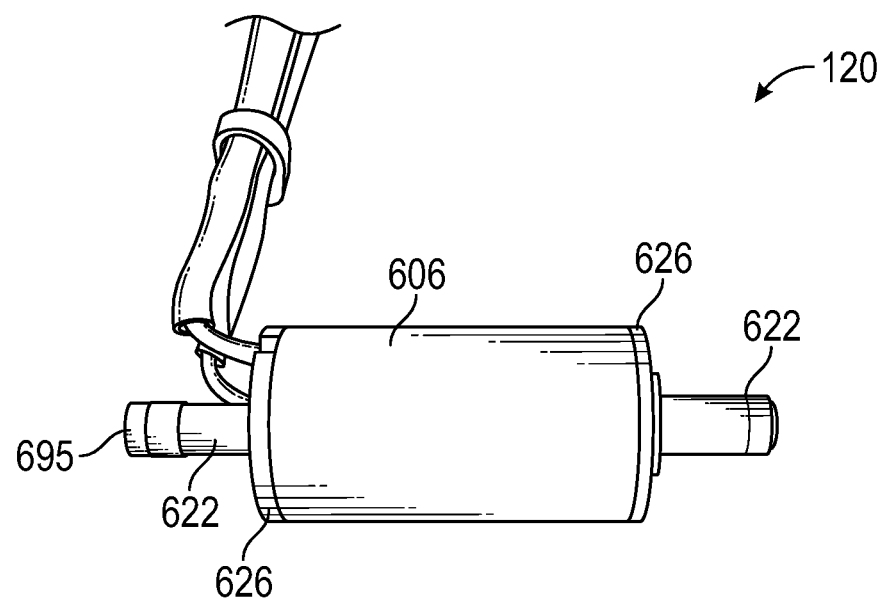

FIG. 7O is a perspective view that illustrates a rotor 620 of the LVM 120 in accordance with a non-limiting embodiment. The rotor 620 is inserted into the stator assembly that is illustrated in FIGS. 7L-7N. FIG. 7P illustrates the stator assembly (e.g., of FIG. 7L) after the rotor 620 (FIG. 7O) has been inserted into the stator assembly as well as motor end caps 626 and bearings 628. The bearings 628 are slipped over the shafts 622 of the rotor 620, and then the motor end caps 626 are slipped over the shafts 622 of the rotor 620 and secured to the motor housing 606. FIG. 7Q illustrates a sensor magnet assembly 690, 695 that serves as a position sensor that provides information regarding angular position of the rotor 620. FIG. 7R illustrates the LVM 120 after the sensor magnet assembly 690, 695 has been attached at one end of the shaft 622 of the rotor 620. FIG. 7S illustrates the completed LVM 120 in accordance with one non-limiting embodiment, where the LVM 120 has a diameter that is less than an inch. However, it should be appreciated that the same method can be used to make LVMs with diameters between about 0.25 centimeters and about 3.8 centimeters (e.g., 0.1 and 1.5 inches).

In the embodiment that is illustrated in FIGS. 6A through 7S, the conductive rods 612 that are used are rod-shaped; however, it should be appreciated that the cross sectional shape of conductive rods 612 used to construct the LVM 120 is not limited to being circular, and that depending on the implementation, other shapes can be used to help increase and/or maximize fill-factor.

For instance, in accordance with another embodiment, the conductors 612 that are used to manufacture the LVM 120 can be bar-shaped.

FIGS. 6A through 7S described one non-limiting embodiment of a LVM 120 that includes a stator that comprises a bottom end turn and a top end turn printed circuit boards that are used to make coil end turns. This embodiment has considerable cost benefits that can reduce overall manufacturing costs, and is particularly useful for smaller LVMs that require currents within a certain range as described above.

However, it should be appreciated that this embodiment is non-limiting, and that in other embodiments, the LVM 120 can be constructed having a more conventional stator construction that does not use bottom end turn and top end turn printed circuit boards to make coil end turns. For example, in another embodiment, the LVM 120 can include a stator where each phase winding has four single-turn coils that are formed from a single piece of wire by threading it through the stator, around an end of the stator to another slot, and back through the stator multiple times to form the four single-turn coils. Although this alternative embodiment of the LVM would be schematically and electronically identical to the embodiments having bottom end turn and top end turn printed circuit boards, it would have a more conventional wound stator design that still uses single-turn coils, but has different structural features than the embodiment of the LVM 120 that is illustrated in and described with reference to FIG. 6A through 7S. Such an alternative embodiment would still be a single-turn motor having ultra-low resistance, ultra-low inductance (and hence low BEMF) that can be driven by a Current Source Inverter. Such an alternative embodiment can be useful, for example, with larger versions of the LVM that require substantially higher currents that would make it difficult or impossible to build printed wiring boards that can handle such higher currents.

CONCLUSION

Thus, various embodiments have been described that can provide a Low Voltage Motor (LVM) and a motor drive system that includes variable current source for driving the LVM. The LVM is especially attractive for fractional horsepower motors such as those that are 2.54 cm (e.g., an inch) or less in diameter. The disclosed embodiments can be applied to technologies such as miniature servo actuator systems used in missiles, guided projectiles, and very small aircraft such as drone or quadcopter aircraft where improved efficiency translates to longer flight times. The LVM can be used in any of these systems to improve performance while also reducing the manufacturing cost Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An electric motor drive system, comprising:
a motor;
a processor;
a current sensor that is configured to sense and sample phase currents in the motor and output a sensed current signal to the processor; and
a motor drive controller configured to control the motor, the motor drive controller comprising:
a variable current source configured to process digital voltage commands to generate a variable current based on a first variable current, a second variable current and a third variable current, wherein the variable current regulates power in the motor, wherein the variable current source comprises:
a Pulse Width Modulation (PWM) waveform generator configured to generate, based on the digital voltage commands, a pulse width modulated (PWM) command signal having a pulse width that is modulated using the digital voltage commands to change the pulse width, wherein the pulse width modulated command signal has a duty cycle that varies to control power supplied to the motor;
a first phase delay element configured to receive the PWM command signal, and to introduce a 120-degree phase delay to the PWM command signal to generate a first phase-delayed drive signal;
a second phase delay element configured to receive the first phase-delayed drive signal, and to introduce another 120-degree phase delay to the first phase-delayed drive signal to generate a second phase-delayed drive signal;
a first circuit comprising: a first gate driver configured to receive the PWM command signal and to generate a first gate drive signal; and a first buck converter circuit configured to receive the first gate drive signal and an input voltage, and to generate the first variable current;
a second circuit comprising: a second gate driver configured to receive the first phase-delayed drive signal and to generate a second gate drive signal; and a second buck converter circuit configured to receive the second gate drive signal and the input voltage, and to generate the second variable current; and
a third circuit comprising: a third gate driver configured to receive the second phase-delayed drive signal and to generate a third gate drive signal; and a third buck converter circuit configured to receive the third gate drive signal and the input voltage, and to generate the third variable current; and
motor commutation circuitry that is separate from the variable current source and configured to receive switching commands and the variable current generated by the variable current source to commutate phase currents to the motor and drive the motor to operate at a commanded angular velocity,
wherein the processor is configured to set motor torque, based on the sensed current signal, by changing pulse width modulation of signals that control the variable current generated by the variable current source to control the phase currents supplied to the motor to control an angular velocity of the motor.

2. The electric motor drive system according to claim 1, wherein the motor comprises:
a low-voltage motor comprising:
a rotor; and
a stator, comprising:
two or more phase windings; and
a number of single-turn coils, wherein each phase winding comprises a plurality of the single-turn coils connected together, and wherein each of the single-turn coils is a single conductive loop that includes only one conductor on each side of the single-turn coil.

3. The electric motor drive system according to claim 1, further comprising:
a motor rotor encoder configured to sense and sample angular position (Or) of the rotor and output rotor angle information as a sensed angular position signal to the processor, wherein the processor is configured to generate, based on the sensed angular position signal, switching commands; and
driver circuitry configured to generate, based on the switching commands from the processor, gate drive signals to control switches within the motor commutation circuitry to commutate of the motor based on the gate drive signals and the variable current.

4. The electric motor drive system according to claim 1, wherein the processor is configured to generate an analog voltage command signal based on commands, and further comprising:
a digital-to-analog (D/A) converter configured to convert the analog voltage command signal into digital voltage commands.

5. A motor drive controller, comprising:
a processor;
a current sensor that is configured to sense and sample phase currents in a motor and output a sensed current signal to the processor; and
a variable current source configured to process digital voltage commands to generate a variable current based on a first variable current, a second variable current and a third variable current, wherein the variable current regulates power in the motor, wherein the variable current source comprises:
a Pulse Width Modulation (PWM) waveform generator configured to generate, based on the digital voltage commands, a pulse width modulated (PWM) command signal having a pulse width that is modulated using the digital voltage commands to change the pulse width, wherein the pulse width modulated command signal has a duty cycle that varies to control power supplied to the motor:
a first phase delay element configured to receive the PWM command signal, and to introduce a 120-degree phase delay to the PWM command signal to generate a first phase-delayed drive signal;
a second phase delay element configured to receive the first phase-delayed drive signal, and to introduce another 120-degree phase delay to the first phase-delayed drive signal to generate a second phase-delayed drive signal;
a first circuit comprising: a first gate driver configured to receive the PWM command signal and to generate a first gate drive signal; and a first buck converter circuit configured to receive the first gate drive signal and an input voltage, and to generate a first variable current; a second circuit comprising:
a second gate driver configured to receive the first phase-delayed drive signal and to generate a second gate drive signal; and a second buck converter circuit configured to receive the second gate drive signal and the input voltage, and to generate a second variable currents and a third circuit comprising:
a third gate driver configured to receive the second phase-delayed drive signal and to generate a third gate drive signal; and a third buck converter circuit configured to receive the third gate drive signal and the input voltage, and to generate a third variable current; and
motor commutation circuitry that is separate from the variable current source and configured to receive switching commands and the variable current generated by the variable current source to commutate phase currents to the motor and drive the motor to operate at a commanded angular velocity,
wherein the processor is configured to set motor torque, based on the sensed current signal, by changing pulse width modulation of signals that control the variable current generated by the variable current source to control the phase currents supplied to the motor to control an angular velocity of the motor.

6. The motor drive controller according to claim 5, further comprising:
a motor rotor encoder configured to sense and sample angular position (Or) of the rotor and output rotor angle information as a sensed angular position signal to the processor, wherein the processor is configured to generate, based on the sensed angular position signal, switching commands; and
driver circuitry configured to generate, based on the switching commands from the processor, gate drive signals to control switches within the motor commutation circuitry to commutate of the motor based on the gate drive signals and the variable current.

7. The motor drive controller according to claim 5, wherein the processor is configured to generate an analog voltage command signal based on commands, and further comprising:
a digital-to-analog (D/A) converter configured to convert the analog voltage command signal into digital voltage commands.

8. The motor drive controller according to claim 5, wherein the motor comprises:
a low-voltage motor comprising:
a rotor; and
a stator, comprising:
two or more phase windings; and
a number of single-turn coils, wherein each phase winding comprises a plurality of the single-turn coils connected together, and wherein each of the single-turn coils is a single conductive loop that includes only one conductor on each side of the single-turn coil.

* * * * *